(12) United States Patent
Chen et al.

(10) Patent No.: US 9,396,889 B1
(45) Date of Patent: Jul. 19, 2016

(54) ELECTRICAL SWITCHING APPARATUS AND SECONDARY DISCONNECT ASSEMBLY WITH CRADLE ASSEMBLY ALIGNMENT AND POSITIONING FEATURES THEREFOR

(71) Applicant: EATON CORPORATION, Cleveland, OH (US)

(72) Inventors: Jianhua Chen, Jiangsu (CN); Rong Zheng, Jiangsu (CN); Hongfeng Zhu, Zhejiang (CN); Yaoming He, Zhejiang (CN)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/678,012

(22) Filed: Apr. 3, 2015

(51) Int. Cl.
*H01H 9/02* (2006.01)
*H01R 33/94* (2006.01)

(52) U.S. Cl.
CPC ............. *H01H 9/0271* (2013.01); *H01R 33/94* (2013.01)

(58) Field of Classification Search
CPC .............................. H01H 9/0271; H01R 33/94
USPC .................................................. 439/715–717
See application file for complete search history.

(56) References Cited

U.S. PATENT DOCUMENTS

| | | | | |
|---|---|---|---|---|
| 3,992,654 | A * | 11/1976 | Springer | H01R 12/7005 361/679.01 |
| 4,171,861 | A | 10/1979 | Hohorst | |
| 5,318,461 | A * | 6/1994 | Frikkee | H01R 9/2625 361/119 |
| 5,615,079 | A | 3/1997 | Eggert et al. | |
| 5,629,831 | A * | 5/1997 | Eggert | H01R 9/2658 361/624 |
| 5,651,702 | A | 7/1997 | Hanning et al. | |
| 5,658,172 | A * | 8/1997 | Schmidt | H01R 31/02 439/709 |
| 5,735,700 | A * | 4/1998 | Hohorst | H01R 9/2483 439/716 |

(Continued)

FOREIGN PATENT DOCUMENTS

EP 0768727 B1 6/1999
EP 0833408 B1 4/2003

(Continued)

OTHER PUBLICATIONS

European Patent Office, International Search Report and Written Opinion (for corresponding application PCT/US2016/023870), Jun. 2, 2016, 10 pages.

*Primary Examiner* — Ross Gushi
(74) *Attorney, Agent, or Firm* — Eckert Seamans Cherin & Mellott, LLC; Grant E. Coffield

(57) ABSTRACT

A secondary disconnect assembly is for an electrical switching apparatus. The secondary disconnect assembly includes a terminal block assembly comprising a mounting member including a number of protrusions, and a cradle assembly coupled to the mounting member and being movable among a plurality of positions with respect to the mounting member. The cradle assembly includes a cradle housing and an inner cradle movably disposed with the cradle housing. The protrusions align and guide the inner cradle with respect to the mounting member. When the inner cradle is disposed in a first predetermined one of the positions, the number of protrusions engage and lock the inner cradle to restrict movement of the inner cradle with respect to the mounting member. When the inner cradle is moved toward a second predetermined one of the positions, the number of protrusions release the inner cradle to move independently with respect to the mounting member.

20 Claims, 15 Drawing Sheets

(56) References Cited

U.S. PATENT DOCUMENTS

| | | | |
|---|---|---|---|
| 5,759,071 A | 6/1998 | Hanning et al. | |
| 5,816,867 A | 10/1998 | Davidsz et al. | |
| 5,879,204 A | 3/1999 | Delarue et al. | |
| 5,938,484 A | 8/1999 | Beege et al. | |
| 6,027,380 A | 2/2000 | Hanning et al. | |
| 6,093,041 A * | 7/2000 | Kay | H01R 9/2408 439/225 |
| 6,155,890 A | 12/2000 | Gerberding | |
| 6,241,561 B1 | 6/2001 | Zebermann et al. | |
| 6,242,702 B1 | 6/2001 | Spiegel et al. | |
| 6,270,383 B1 | 8/2001 | Wielsch et al. | |
| 6,350,162 B1 | 2/2002 | Despang | |
| 6,371,435 B1 * | 4/2002 | Landis | H02B 1/052 248/694 |
| 6,392,319 B1 * | 5/2002 | Zebermann | H01R 9/2675 307/147 |
| 6,425,770 B1 * | 7/2002 | Lostoski | H01R 9/26 361/759 |
| 6,464,545 B2 | 10/2002 | Yano | |
| 6,506,071 B2 * | 1/2003 | Lange | H01R 9/26 439/358 |
| 6,663,441 B1 * | 12/2003 | Alexandre | H01R 4/4827 439/715 |
| 6,692,292 B2 | 2/2004 | Huiskamp et al. | |
| 6,712,641 B2 | 3/2004 | Beege et al. | |
| 6,806,424 B2 | 10/2004 | Gerving | |
| 6,848,951 B1 * | 2/2005 | Bechaz | H01R 9/2491 439/716 |
| 6,893,286 B2 | 5/2005 | Drewes et al. | |
| 6,935,893 B1 | 8/2005 | Flowers et al. | |
| 7,066,677 B2 * | 6/2006 | Ruter | H01R 13/516 403/231 |
| 7,179,137 B1 * | 2/2007 | Quendt | H01R 4/4827 439/828 |
| 7,192,316 B1 * | 3/2007 | Pollmann | H01R 9/2675 439/716 |
| 7,367,852 B2 * | 5/2008 | Niggemann | H01R 9/2491 439/715 |
| 7,491,084 B2 * | 2/2009 | Wedler | H01R 9/03 439/404 |
| 7,491,096 B1 * | 2/2009 | Correll | H01R 9/2408 439/716 |
| 7,513,800 B2 | 4/2009 | Nolting et al. | |
| 7,544,908 B2 | 6/2009 | Webb et al. | |
| 7,553,199 B2 * | 6/2009 | Correll | H01R 9/2491 439/715 |
| 7,566,234 B2 | 7/2009 | Hackemack et al. | |
| 7,568,939 B2 | 8/2009 | Diekmann | |
| 7,614,914 B2 | 11/2009 | Besana et al. | |
| 7,658,653 B2 * | 2/2010 | Diekmann | H01H 85/2045 439/715 |
| 7,666,037 B2 * | 2/2010 | Diessel | H01R 9/2616 439/716 |
| 7,977,595 B2 | 7/2011 | Lee et al. | |
| 8,128,435 B2 * | 3/2012 | Trinh | H01R 9/2491 439/661 |
| 8,497,439 B2 | 7/2013 | Pai et al. | |
| 8,512,067 B2 * | 8/2013 | Denter | H01R 4/2429 439/403 |
| 8,597,037 B2 * | 12/2013 | Halim | H01R 9/2458 439/141 |
| 8,602,816 B2 * | 12/2013 | Donhauser | H01R 13/516 439/532 |
| 8,604,368 B2 | 12/2013 | Kim et al. | |
| 8,921,713 B2 * | 12/2014 | Eriksson | H01H 9/0066 174/541 |
| 8,986,033 B2 * | 3/2015 | Berger | H05K 7/1468 439/341 |
| 8,998,654 B2 * | 4/2015 | Donhauser | H01R 13/02 439/709 |
| 9,055,688 B2 * | 6/2015 | Molnar | H05K 7/1469 |
| 9,196,985 B2 * | 11/2015 | Miller | H01R 12/712 |
| 2001/0034165 A1 * | 10/2001 | Landis | H01R 13/6658 439/716 |
| 2007/0218730 A1 | 9/2007 | Wu | |
| 2009/0015990 A1 | 1/2009 | Kim et al. | |
| 2010/0081343 A1 * | 4/2010 | Bodenmeier | H01H 1/5844 439/715 |
| 2011/0062011 A1 * | 3/2011 | Pollmann | H01H 1/365 200/554 |
| 2011/0147173 A1 | 6/2011 | Lee et al. | |
| 2011/0177724 A1 * | 7/2011 | Pizzi | H01R 9/265 439/716 |
| 2012/0264339 A1 | 10/2012 | Brand et al. | |
| 2013/0027890 A1 * | 1/2013 | Berger | H05K 7/1468 361/747 |
| 2014/0113502 A1 * | 4/2014 | Barber | H01R 4/4836 439/709 |
| 2014/0187082 A1 * | 7/2014 | Chen | H01R 43/18 439/532 |

FOREIGN PATENT DOCUMENTS

| | | |
|---|---|---|
| EP | 0913884 B1 | 1/2007 |
| EP | 1798744 A1 | 6/2007 |
| EP | 1555726 B1 | 8/2007 |
| EP | 2 015 338 A2 | 1/2009 |
| KR | 131753 | 6/2011 |

* cited by examiner

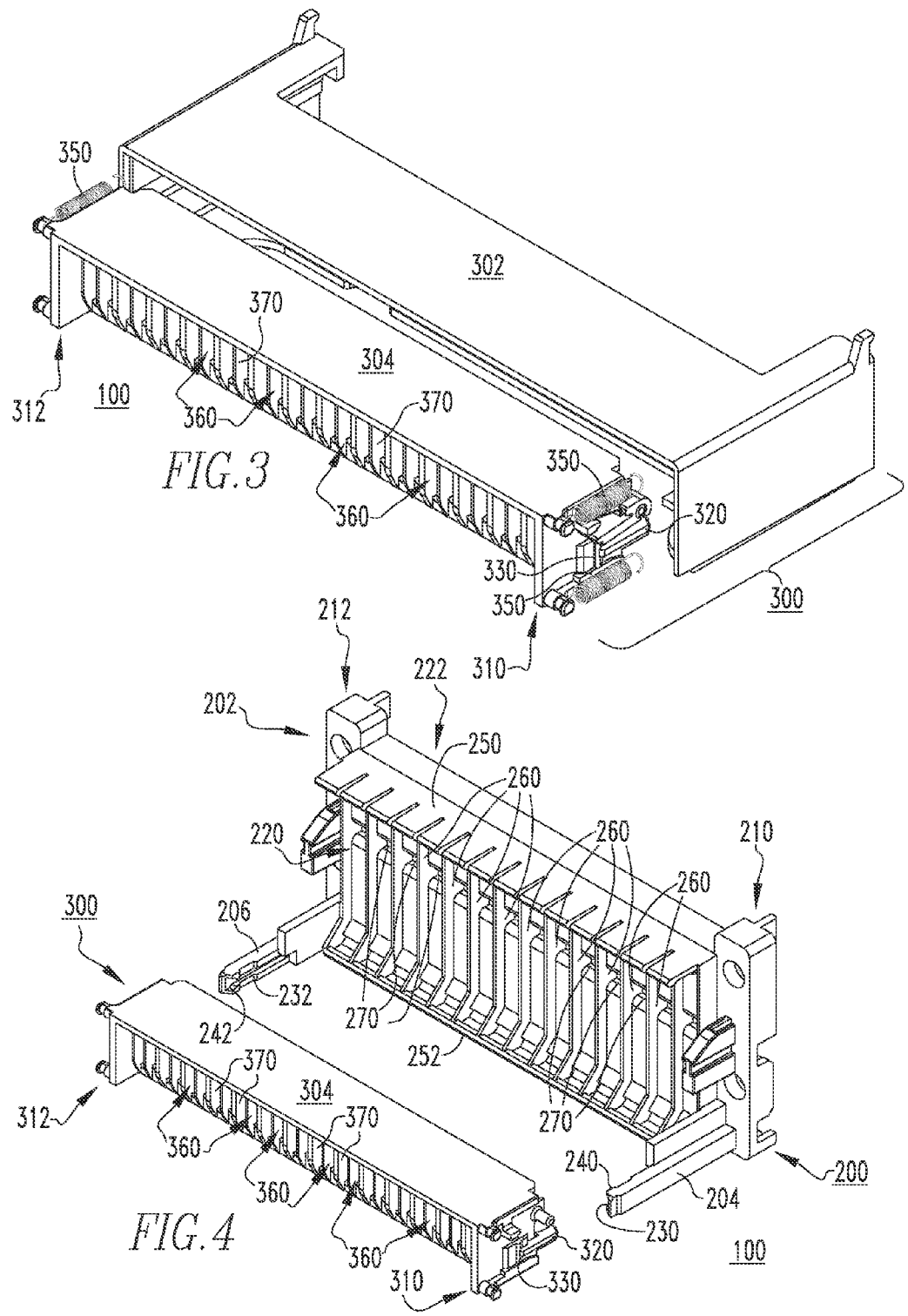

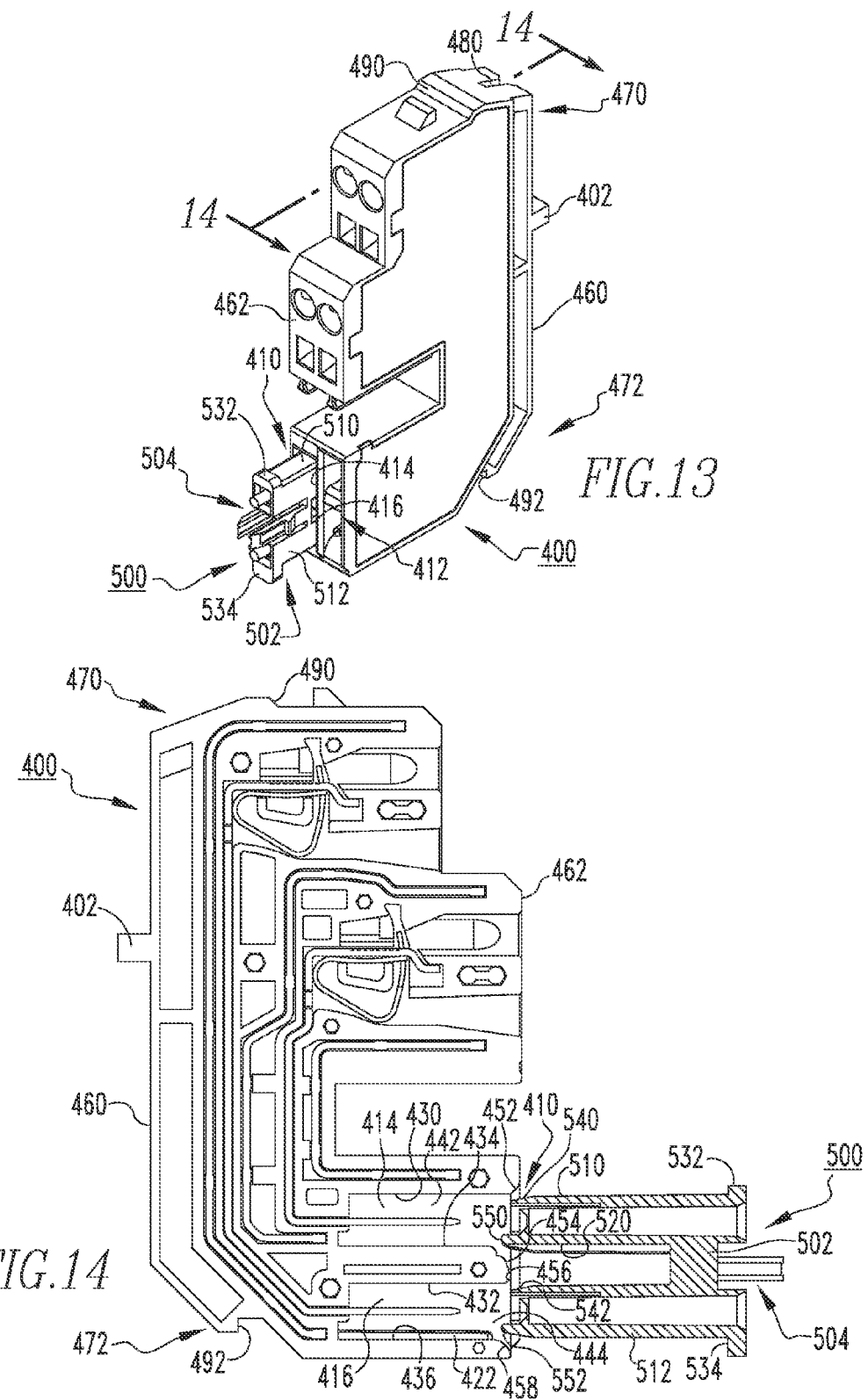

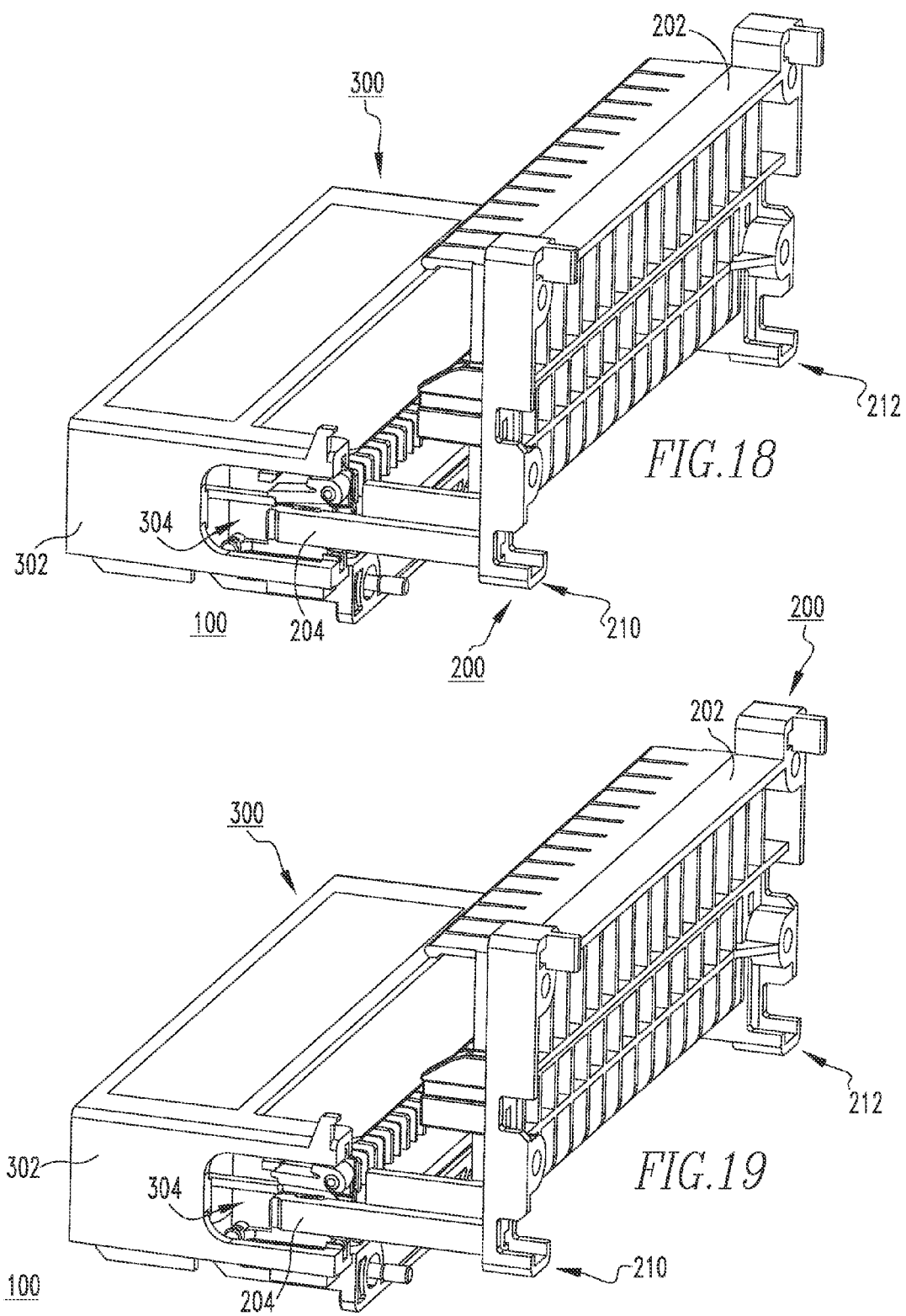

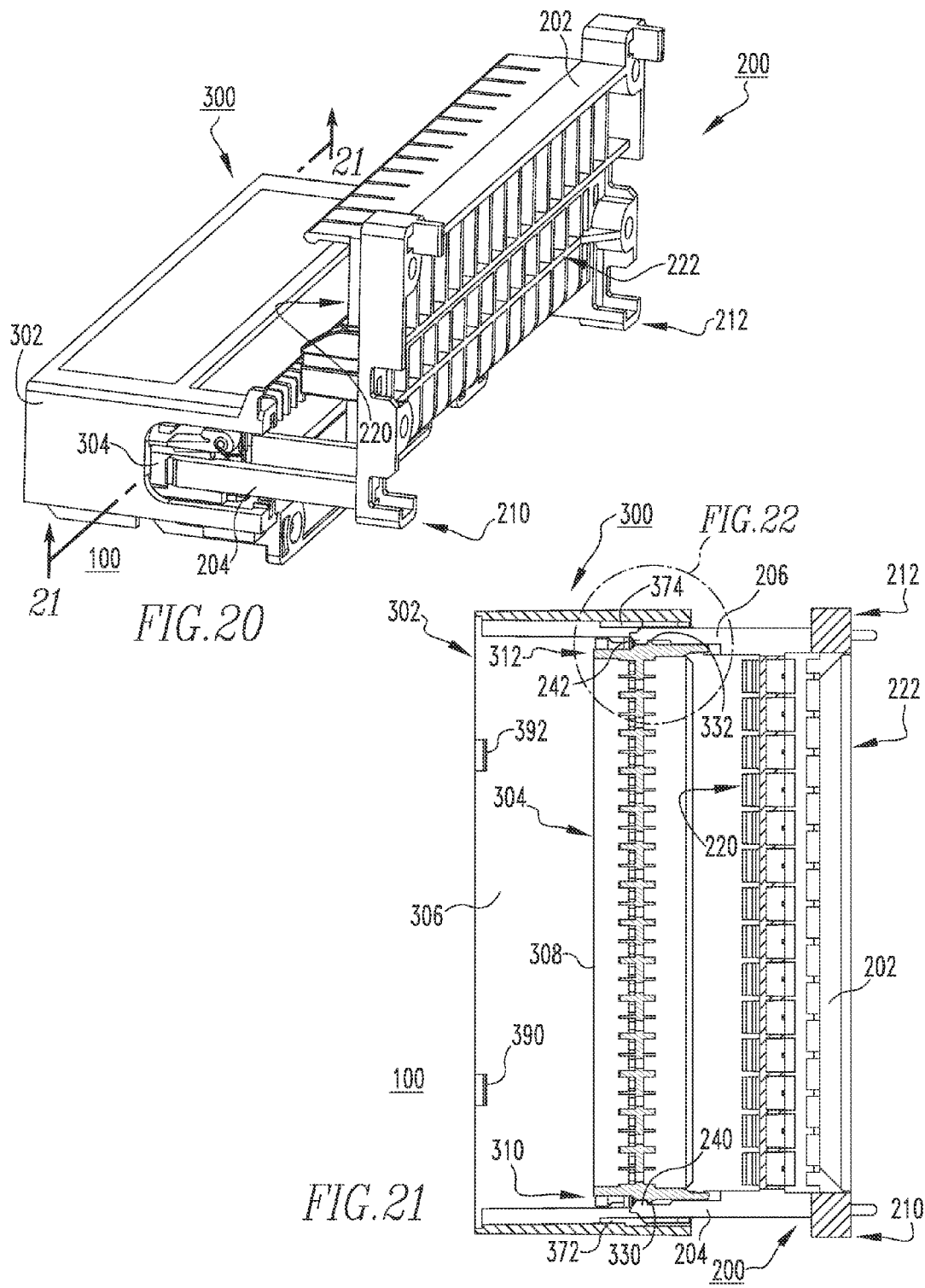

ELECTRICAL SWITCHING APPARATUS AND SECONDARY DISCONNECT ASSEMBLY WITH CRADLE ASSEMBLY ALIGNMENT AND POSITIONING FEATURES THEREFOR

CROSS-REFERENCE TO RELATED APPLICATIONS

This application is related to commonly assigned, concurrently filed U.S. patent application Ser. No. 14/678,084 filed, Apr. 3, 2015, and entitled "ELECTRICAL SWITCHING APPARATUS AND SECONDARY DISCONNECT ASSEMBLY WITH ERROR-PROOFING FEATURES THEREFOR", which is incorporated herein by reference; and This application is related to commonly assigned, concurrently filed U.S. patent application Ser. No. 14/768,040 filed, Apr. 3, 2015, and entitled "ELECTRICAL SWITCHING APPARATUS AND SECONDARY DISCONNECT ASSEMBLY WITH CONTACT ALIGNMENT FEATURES THEREFOR", which is incorporated herein by reference.

This application is related to commonly assigned, concurrently filed U.S. patent application Ser. No. 14/678,035 filed, Apr. 3, 2015, and entitled "ELECTRICAL SWITCHING APPARATUS AND SECONDARY DISCONNECT ASSEMBLY WITH TERMINAL RETENTION AND CORRECTION FEATURES THEREFOR", which is incorporated herein by reference.

BACKGROUND

1. Field

The disclosed concept relates generally to electrical switching apparatus and, more particularly, to electrical switching apparatus, such as circuit breakers. The disclosed concept also relates to circuit breaker secondary disconnect assemblies having cradle assembly alignment and positioning features.

2. Background Information

Electrical switching apparatus, such as circuit breakers, provide protection for electrical systems from electrical fault conditions such as, for example, current overloads, short circuits, abnormal voltage and other fault conditions.

In power distribution systems, for example, power circuit breakers, which are also commonly referred to in the art as air circuit breakers, are often mounted within a switchgear enclosure either individually or in combination with other switchgear (e.g., without limitation, circuit switching devices and circuit interrupters such as circuit breakers, contactors, motor starters, motor controllers and other load controllers). Generally, there are two types or categories (i.e., sizes or configurations) of power circuit breakers, a relatively larger "draw-out" design, and a relatively smaller "fixed" design. The "draw-out" variety of power circuit breaker is movable with respect to a draw-out frame, also known as a cassette, whereas the "fixed" variety of power circuit breaker is generally fixed in position. Draw-out and fixed power circuit breakers have secondary terminal assemblies, which are similar in design.

The secondary terminal assembly of a draw-out power circuit breaker, for example, generally includes a plurality of terminal blocks, a mounting structure (e.g., without limitation, an elongated DIN rail) for mounting the terminal blocks, a movable cradle assembly, and a plurality of accessory plugs movable with the cradle assembly to electrically connect and disconnect from the terminal blocks. Thus, the secondary disconnect assembly allows the customer to establish a plurality of secondary terminal connections, for example, to populate the circuit breaker with a variety of desired accessories or features. In this manner, the customer can relatively easily customize the circuit breaker for a particular application. In addition, the secondary disconnect assembly provides a convenient mechanism to safely perform a test, such as for example, testing the sequence of a circuit breaker control circuit or powering an installed accessory to test its function before the circuit breaker enters service. That is, the circuit breaker is movable among a CONNECT position corresponding to the circuit breaker being completely inserted or installed within the cassette and electric power being supplied through both the primary and the secondary terminal connections, a TEST position corresponding to the circuit breaker being partially drawn-out of the cassette and power being supplied through only the secondary terminal connections, and a DISCONNECT position corresponding to both the secondary terminal connections and primary connections being disconnected, for example, to permit the circuit breaker to be completely withdrawn from the cassette to inspect, modify or replace the circuit breaker.

The components of the secondary disconnect assembly must be suitably supported and accurately aligned and positioned to ensure proper interaction (i.e., mating; de-mating) of the secondary terminal assembly components for reliable operation of the circuit breaker.

There is room for improvement in electrical switching apparatus, such as circuit breakers, and in secondary disconnect assemblies therefor.

SUMMARY

These needs and others are met by embodiments of the disclosed concept, which are directed to a secondary disconnect assembly for an electrical switching apparatus, which among other benefits includes a number of features for improved alignment and positioning of assembly components.

As one aspect of the disclosed concept, a secondary disconnect assembly is provided for an electrical switching apparatus. The secondary disconnect assembly comprises: a terminal block assembly comprising a mounting member including a number of protrusions; and a cradle assembly coupled to the mounting member and being movable among a plurality of positions with respect to the mounting member, the cradle assembly comprising a cradle housing and an inner cradle movably disposed within the cradle housing. The number of protrusions align and guide the inner cradle with respect to the mounting member. When the inner cradle is disposed in a first predetermined one of the positions, the number of protrusions engage and lock the inner cradle to restrict movement of the inner cradle with respect to the mounting member. When the inner cradle is moved toward a second predetermined one of the positions, the number of protrusions are structured to release the inner cradle to move independently with respect to the mounting member.

The mounting member may be a terminal block mount structured to receive a plurality of terminal blocks. The terminal block mount may comprise a first end, a second end disposed opposite and distal from the first end, a first side, and a second side disposed opposite the first side. The number of protrusions may be a first alignment post and a second alignment post, wherein the first alignment post protrudes outwardly from the first side of the terminal mounting block proximate the first end of the terminal mounting block, and wherein the second alignment post protrudes outwardly from the first side of the terminal mounting block proximate the second end of the terminal mounting block. The inner cradle may comprise a first end and a second end disposed opposite and distal from the first end of the inner cradle. The first alignment post may removably engage a portion of the first end of the inner cradle and the second alignment post may removably engage a portion of the second end of the inner cradle. The first alignment post may include a first elongated groove and the second alignment post may include a second elongated groove, and the first end of the inner cradle may include a first rib and the second end of the inner cradle may include a second rib, wherein the first rib is movably disposed within the first elongated groove and the second rib is movably disposed within the second elongated groove.

The first alignment post may further include a first molded barb and the second alignment post may further include a second molded barb. The first end of the inner cradle may further include a first molded boss and the second end of the inner cradle may further include a second molded boss. The first predetermined position may be a latched position corresponding to the inner cradle being fixed in position with respect to the terminal block mount. When the inner cradle is disposed in the latched position, the first molded barb may engage the first molded boss and the second molded barb may engage the second molded boss to resist movement of the inner cradle with respect to the terminal block mount.

As another aspect of the disclosed concept, an electrical switching apparatus comprises: a housing; and a secondary disconnect assembly cooperating with the housing, the secondary disconnect assembly comprising: a terminal block assembly comprising a mounting member including a number of protrusions, and a cradle assembly coupled to the mounting member and being movable among a plurality of positions with respect to the mounting member, the cradle assembly comprising a cradle housing and an inner cradle movably disposed with the cradle housing. The number of protrusions align and guide the inner cradle with respect to the mounting member. When the inner cradle is disposed in a first predetermined one of the positions, the number of protrusions engage and lock the inner cradle to restrict movement of the inner cradle with respect to the mounting member. When the inner cradle is moved toward a second predetermined one of the positions, the number of protrusions are structured to release the inner cradle to move independently with respect to the mounting member.

BRIEF DESCRIPTION OF THE DRAWINGS

A full understanding of the disclosed concept can be gained from the following description of the preferred embodiments when read in conjunction with the accompanying drawings in which:

FIG. 3 is an exploded isometric view of the cradle assembly of the secondary disconnect assembly of FIG. 2;

FIG. 4 is another exploded isometric view of portions of the secondary disconnect assembly;

FIG. 13 is another isometric view of a terminal block, showing an accessory plug installed therein;

FIG. 14 is a section view taken along line 14-14 of FIG. 13, modified to show the accessory plug removed from the terminal block;

FIGS. 18-20 are isometric views of the cradle assembly and terminal block mount, also showing a retention feature for the inner cradle;

FIG. 21 is a section view taken along line 21-21 of FIG. 20;

DESCRIPTION OF THE PREFERRED EMBODIMENTS

Figure 1:
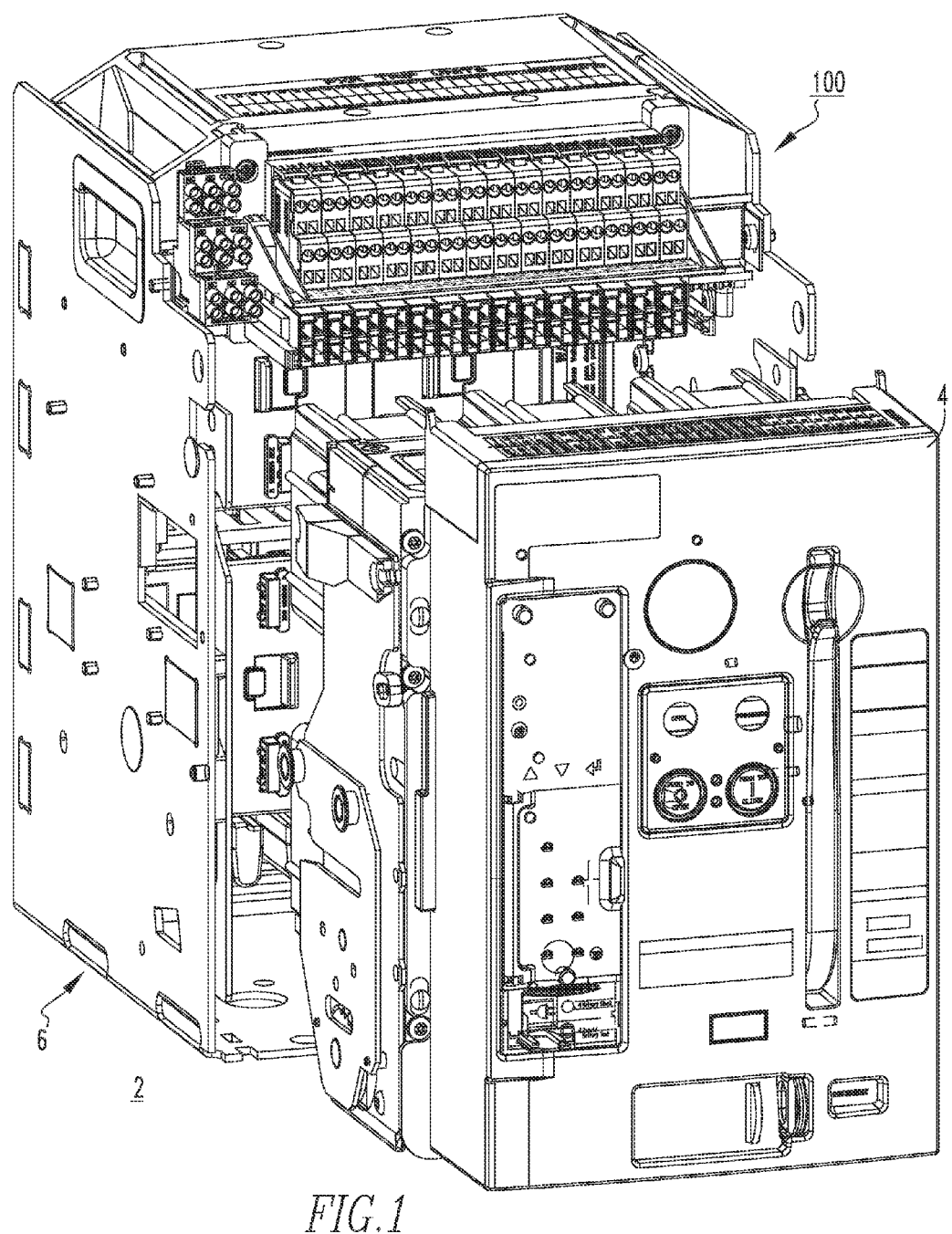
FIG. 1 is an isometric view of an electrical switching apparatus and secondary disconnect assembly therefor, in accordance with an embodiment of the disclosed concept.

For purposes of illustration, embodiments of the disclosed concept will be described as applied to a non-limiting example embodiment of a "draw-out" power circuit breaker, although it will become apparent that they could also be applied to a wide variety of other types of electrical switching apparatus including, for example and without limitation, "fixed" power circuit breakers.

Directional phrases used herein, such as, for example, clockwise, counterclockwise, left, right, up, down, front, back, top, bottom and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, rivets, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 shows an electrical switching apparatus, such as for example without limitation a power circuit breaker 2, which employs a secondary disconnect assembly 100 in accordance with a non-limiting example embodiment of the disclosed concept. In the example of FIG. 1, the power circuit breaker 2 includes a housing 4, which is movable with respect to a frame or cassette 6. In other words, the circuit breaker 2 can be drawn or racked into and out of the cassette 6 to a variety of desired positions including, for example and without limitation, a DISCONNECT position, a CONNECT position, and a TEST position (see, for example, FIG. 7B). It will be appreciated, therefore, that the disclosed secondary disconnect assembly 100 provides a mechanism for automatically mating (i.e., electrically connecting) and de-mating (electrically disconnecting) a plurality of secondary terminal connections for the circuit breaker 2.

Figure 2:
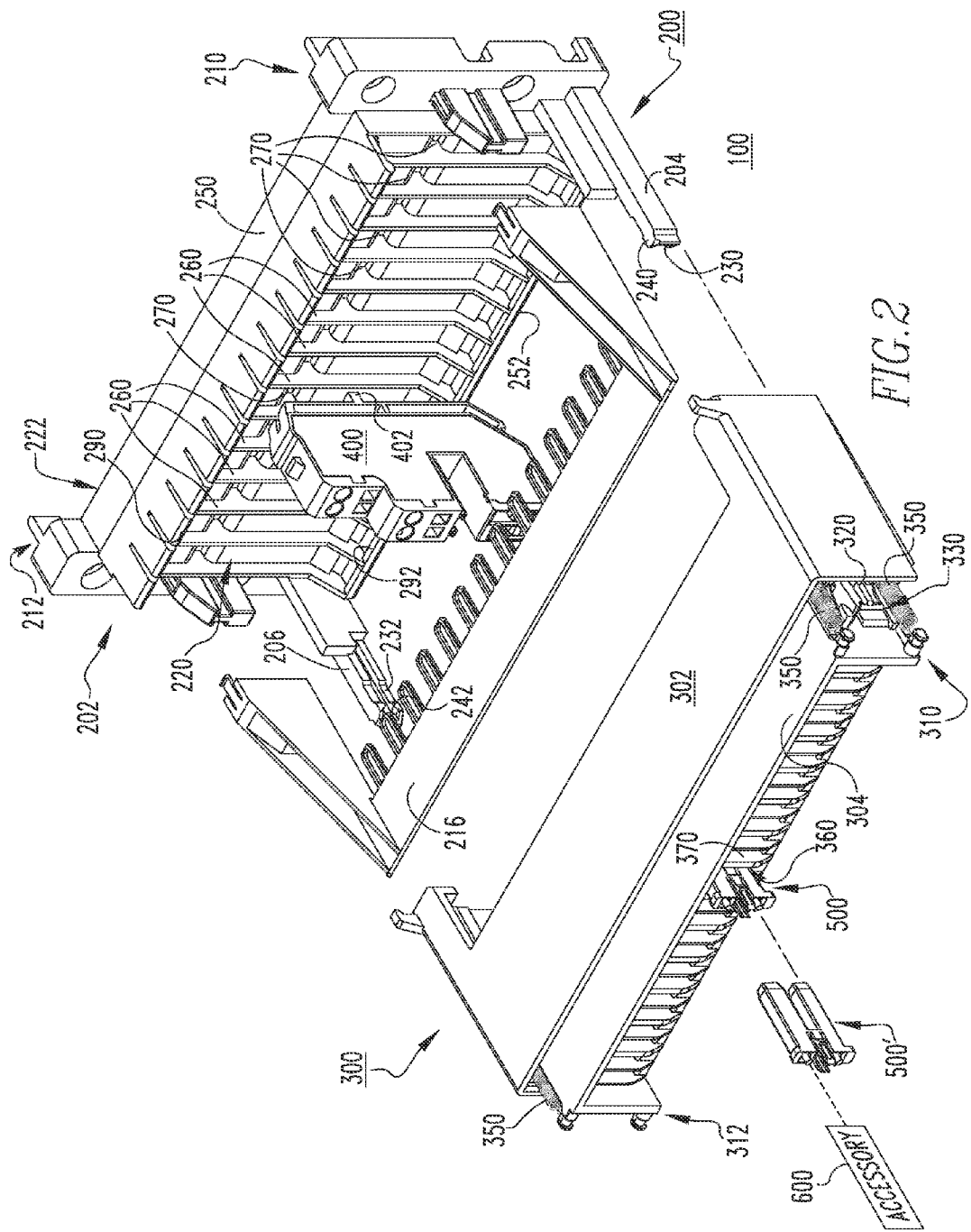
FIG. 2 is an exploded isometric view of the secondary disconnect assembly of FIG. 1.

Referring to FIG. 2, in one non-limiting example embodiment, the disclosed secondary disconnect assembly 100 includes a terminal block assembly 200 having a mounting member 202. A cradle assembly 300 is coupled to the mounting member 202 and is movable among a plurality of positions (e.g., without limitation, CONNECT position; TEST position; DISCONNECT position) with respect to the mounting member 202. The cradle assembly 300 includes a cradle housing 302 and an inner cradle 304 movably disposed within the cradle housing 302. The example mounting member is a terminal block mount 202 structured to receive a plurality of terminal blocks 400. The terminal block mount 202 includes a number of protrusions 204,206 (two are shown). As will be described herein, the protrusions 204,206 comprise alignment posts, which are structured to align and guide the inner cradle 304 with respect to the terminal block mount 202. Additionally, particularly unique to the disclosed secondary disconnect assembly 100, when the inner cradle 304 is disposed in a first predetermined position (e.g., when the inner cradle 304 is disposed within the full range of the TEST position through the CONNECT position), the alignment posts 204,206 also function to engage and lock the inner cradle 304 to restrict undesired movement of the inner cradle 304 with respect to the terminal block mount 202. In other words, the disclosed secondary disconnect assembly 100 includes a mechanism for ensuring proper mechanical support and positioning as well as alignment of the components (e.g., without limitation, terminal block assembly 200; inner cradle 304) of the secondary disconnect assembly 100. Further, the ability of the alignment posts 204,206 to engage and lock the inner cradle 304 helps to ensure the movable components are properly locked out, as desired, yet when the inner cradle 304 is moved toward a second predetermined one of the positions (e.g., without limitation, DISCONNECT position), or is otherwise removed from the TEST position or CONNECT position, the alignment posts 204,206 are structured to release the inner cradle 304, as shown for example in FIG. 7A, such that the inner cradle 304 can move independently with respect to the terminal block mount 202, as desired.

Continuing to refer to FIG. 2, and also to FIGS. 3-7B, the terminal block mount 202 is structured to receive a plurality of terminal blocks 400 (one terminal block 400 is shown in FIG. 2; see also FIGS. 9 and 11-14). The example terminal block mount 202 is a single-piece molded member having opposing first and second ends 210,212 and opposing first and second sides 220,222. The aforementioned protrusions are a first alignment post 204 protruding outwardly from the first side 220 of the terminal mounting block 202 proximate the first end 210 thereof, and a second alignment post 206 protruding outwardly from the first side 220 of the terminal mounting block 202 proximate the second end 212 thereof.

Figure 6:
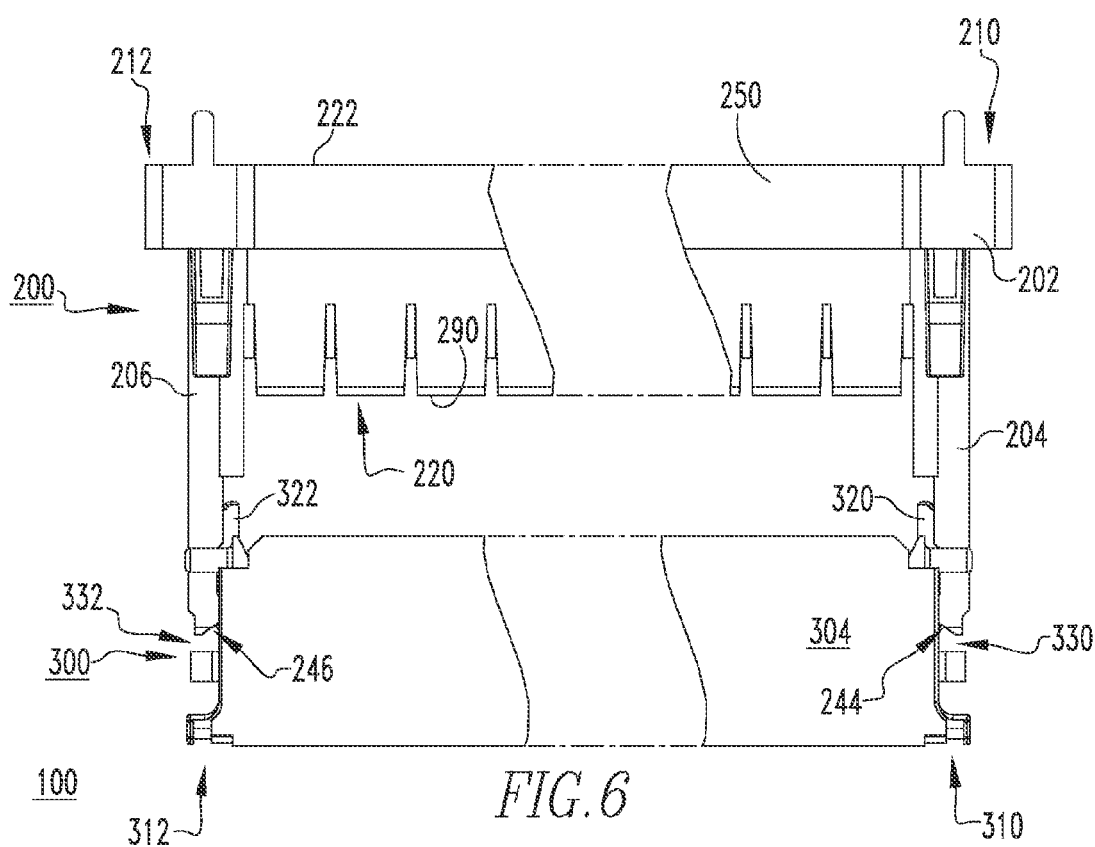
FIG. 6 is a top plan view of the cradle assembly alignment and positioning feature of FIG. 5.
Figures 7A, 7B:
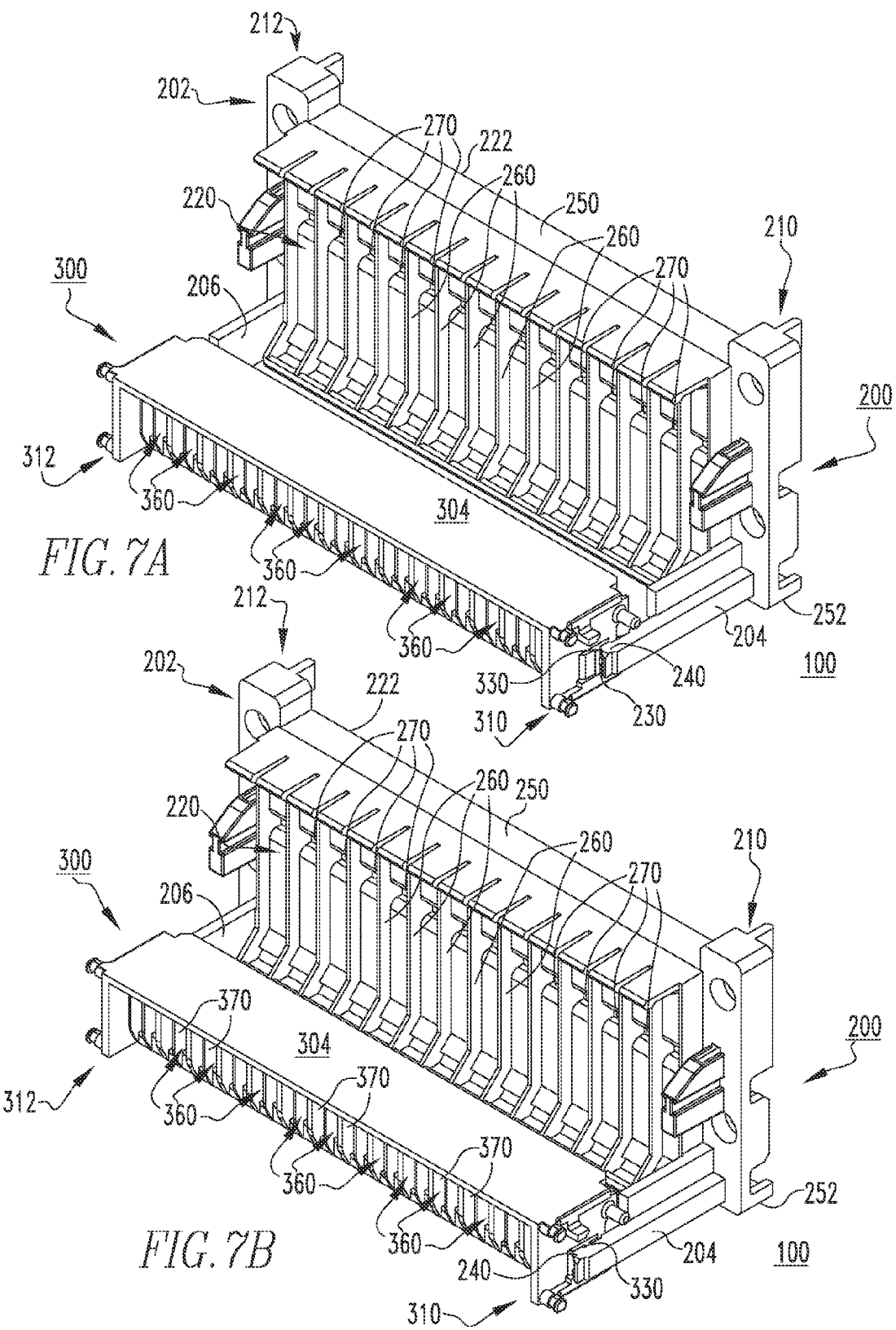
FIG. 7A is an isometric view showing portions of the secondary disconnect assembly disposed in a first position.
FIG. 7B is an isometric view showing portions of the secondary disconnect assembly disposed in a second position.

As shown in the exploded view of FIG. 3, the inner cradle 304 has first and second opposing ends 310,312. As best shown in FIGS. 6, 7A and 7B, the first alignment post 204 removably engages a portion of the first end 310 of the inner cradle 304, and the second alignment post 206 removably engages a portion of the second end 312 of the inner cradle 304. The example secondary disconnect assembly 100 also includes an optional comb 216. When such comb 216 is optionally employed, it is generally disposed between the terminal block assembly 200 and cradle assembly 300, as shown in FIG. 2. It will be appreciated, however, that other non-limiting example embodiments (not shown) wherein no such comb member is required or desired, are contemplated by the disclosed concept.

Figure 5:
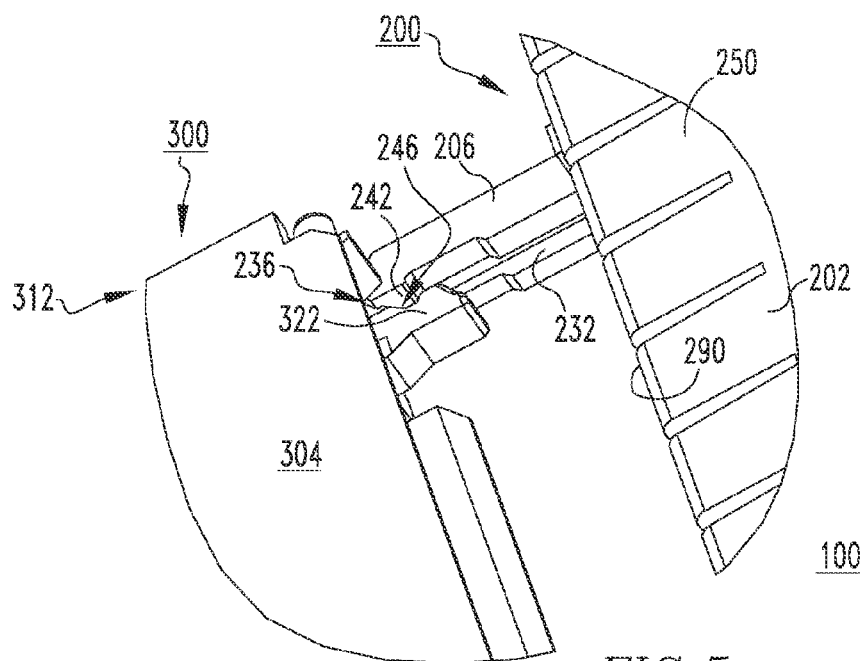
FIG. 5 is an enlarged view of a cradle assembly alignment and positioning feature for the secondary disconnect assembly, in accordance with an embodiment of the disclosed concept.
Figure 10:
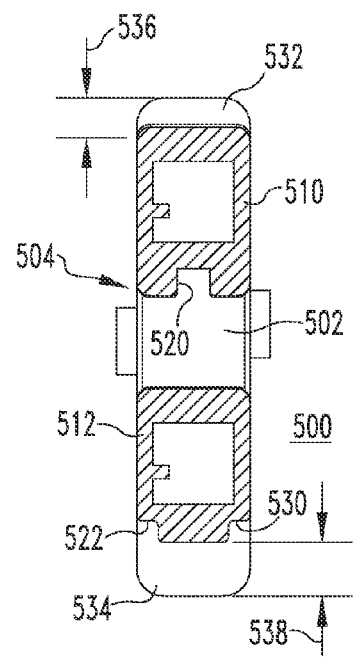
FIG. 10 is an end elevation partially in section view taken along line 10-10 of FIG. 8.
Figure 11:
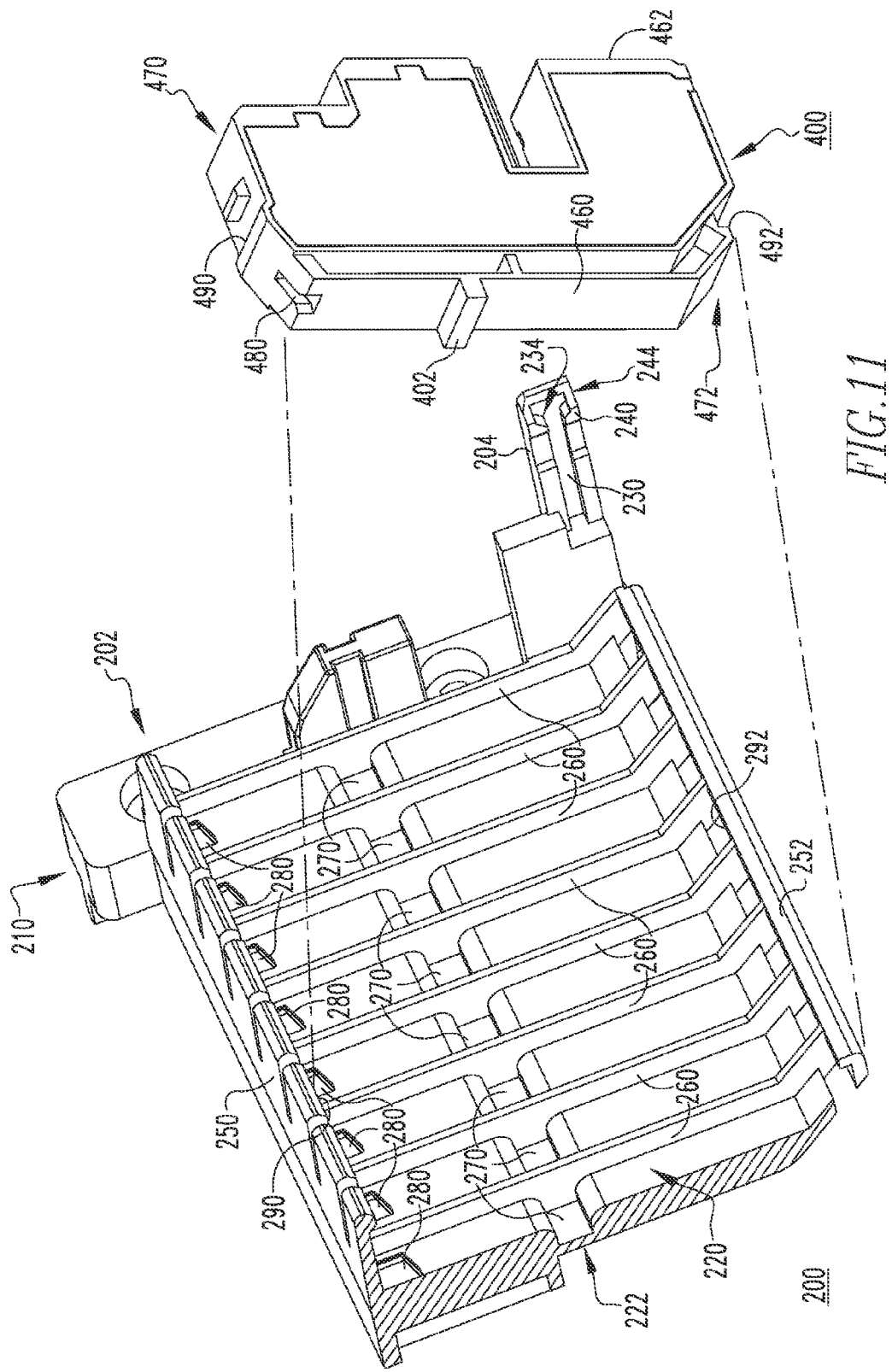
FIG. 11 is an exploded isometric view showing a portion of the terminal block mount of the secondary disconnect assembly and a terminal block.

Referring to the enlarged views of FIGS. 5 and 11, it will be appreciated that the first and second alignment posts 204,206 respectively include first and second elongated grooves 230, 232. The elongated grooves 230,232 are structured to receive corresponding ribs 320,322 of the inner cradle 304, as shown in FIG. 6. More specifically, the first end 310 of the inner cradle 304 includes a first rib 320, and the second end 312 of the inner cradle 304 includes a second rib 322. The first rib 320 is movably disposed within the first elongated groove 230 of the first alignment post 204, and the second rib 322 is movably disposed within the second elongated groove 232 of the second alignment post 206. In this manner, the alignment posts 204,206 serve to align, support and movably position and guide the inner cradle 304 with respect to the terminal block mount 202, as desired. This, in turn, facilitates proper interaction among other components of the disclosed secondary disconnect assembly 100 (e.g., without limitation, accessory plugs 500,500' of FIG. 2; see also accessory plug 500, shown in FIGS. 8, 10 and 13-17).

As shown in FIGS. 5, 6, 11, 12A and 12B, the first and second elongated grooves 230,232 further include tapered or sloped entrances to further facilitate proper alignment or constraint and guidance of the inner cradle 304. Specifically, the first alignment post 204 includes a first sloped segment 234, which cooperates with the inner cradle 304 to facilitate vertical alignment and guidance of the first rib 320 into the first elongated groove 230, and a second sloped segment 244, which facilitates transverse (i.e., horizontal) alignment and guidance of the first rib 320 into the first elongated groove 230. Similarly, it will be appreciated that the second alignment post 206 has a substantially similar structure including first and second sloped segments 236,246, which respectively facilitate vertical and horizontal alignment and guidance of the second rib 322 into the second elongated groove 232.

As shown, for example, in FIGS. 4, 6, 12A and 12B, the first alignment post 204 further includes a first molded barb 240 and the second alignment post 206 further includes a second molded barb 242. The first and second molded barbs 240,242 are structured to cooperate with first and second molded bosses 330,332, respectively, which are disposed on the inner cradle 304. More specifically, the first end 310 of the inner cradle 304 includes a first molded boss 330 and the second end 312 of the inner cradle 304 includes a second molded boss 332. In the TEST position, shown in FIG. 7B, which corresponds to a locked-out or latched position wherein the inner cradle 304 is locked in position with respect to the terminal block mount 202, the first molded barb 240 engages the first molded boss 330 and the second molded barb 242 engages the second molded boss 332, thereby resisting movement of the inner cradle 304 with respect to the terminal block mount 202. It will be appreciated that the inner cradle 304 is also latched in the CONNECT position. When the inner cradle 304 is removed from such latched position, for example, to the DISCONNECT position, the first and second molded barbs 240,242 are structured to deflect outwardly to release the first and second molded bosses 330,332, thereby releasing the inner cradle 304 so that it may move independently with respect to the terminal block mount 202.

Figure 8:
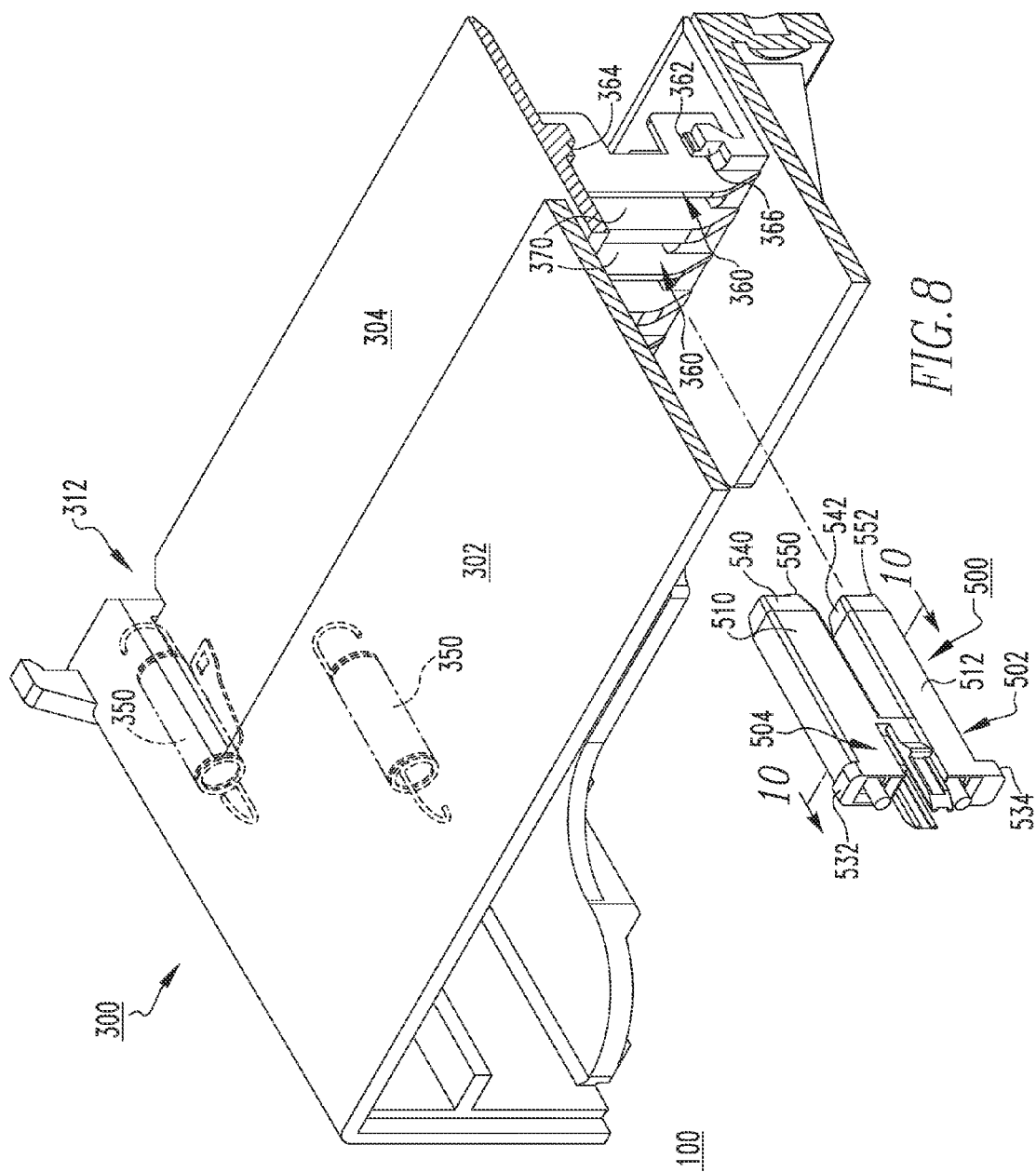
FIG. 8 is an isometric partially exploded and partially in section view of portions of the secondary disconnect assembly.

As shown in FIGS. 2, 3 and in hidden line drawing in FIG. 8, the example cradle assembly 300 further includes a plurality of extension springs 350. The extension springs 350 bias the inner cradle 304 toward the latched position. The aforementioned locking capability afforded by the molded barbs 240,242 and corresponding molded bosses 330,332 serves to further assist or supplement the function of the extension springs 350, for example, to ensure the inner cradle 304 remains in the desired predetermined locked-out configuration with respect to the terminal block mount 202, when desired.

As shown in FIGS. 2, 4, 7A, 7B and 11-12B, the terminal block mount 202 of the example secondary disconnect assembly 100 further includes a number of unique features to facilitate proper positioning and alignment of secondary disconnect assembly components. For example and without limitation, as previously discussed, the terminal block mount 202 is preferably a single-piece molded member. In the example, shown, the single-piece molded member 202 includes first and second opposing edges 250,252 and a plurality of parallel molded walls 260, which extend between the first and second edges 250,252 on the first side 220 of the terminal block 202, as shown. Each of the terminal blocks 400 (FIGS. 2, 11, 12A and 12B) is structured to be aligned and secured between a corresponding pair of such parallel walls 260. Accordingly, among other benefits, the terminal block mount 202 further serves to provide improved vertical and horizontal alignment and mechanical support of the terminal blocks 400.

Still further alignment and positioning accuracy is provided by yet another unique feature of the single-piece molded terminal block mount 202. Specifically, as shown in FIGS. 2, 4, 7A, 7B and 11-12B, the single-piece molded member 202 preferably further includes a plurality of molded recesses 270, and each of the terminal blocks 400 preferably includes a molded protrusion 402 (best shown in FIG. 11). The molded protrusion 402 is structured to be aligned with, and secured within, a corresponding one of the molded recesses 270, which is disposed between the aforementioned parallel molded walls 260. It will be appreciated that any known or suitable alternative number, shape, type or configuration of alignment and positioning feature(s) other than or in addition to the molded recesses 270 and terminal block molded protrusions 402 could be employed, without departing from the scope of the disclosed concept. For example and without limitation, the molded protrusion or other feature (not shown) could be disposed instead on the terminal block mount to cooperate with a molded recess or other feature (not shown) that is disposed instead on the terminal block.

Accordingly, the disclosed secondary disconnect assembly 100 advantageously provides a number of unique alignment and positioning features, which among other benefits, serve to improve interaction among the components (e.g., without limitation, terminal block assembly 200; inner cradle 304) of the secondary disconnect assembly 100, thereby improving function and reliability of the assembly, as well as overall function and reliability of the circuit breaker 2.

In addition, the secondary disconnect assembly 100 preferably includes a number of error-proofing features (e.g., without limitation, first error-proofing features 420,422; second error-proofing features 520,522; third error-proofing features 362,364,366; fourth error-proofing features 530,532, 534) structured to ensure components (e.g., without limitation, cradle assembly 300; terminal blocks 400; accessory plugs 500,500' (FIG. 2)); properly align and interact with one another. For example and without limitation, it is important to prevent an accessory plug 500 from being inserted upside down into a terminal block 400, and to ensure the accessory plug 500 is properly disposed in the cradle assembly 300. Thus, the error-proofing features (e.g., 362,364,366; 420,422; 520,522,530,532,534) advantageously function as rejection features to reject insertion or connection of the accessory plugs 500 unless they are correctly disposed in a specific predetermined orientation (e.g., without limitation, the plug is disposed in the correct upright position, rather than inverted or upside down). In this manner, damage is avoided that could otherwise occur from improper electrical connection.

As previously discussed, the secondary disconnect assembly 100 includes a plurality of accessory plugs 500,500' (only one accessory plug 500 is shown and described in detail), which electrically connect accessories 600 (shown in simplified form in FIG. 2), when the accessory plugs 500,500' are removably inserted into corresponding terminal blocks 400. In accordance with one non-limiting example embodiment of the disclosed concept, both the terminal block 400 and the accessory plug 500 include a plurality of error-proofing features 420,422 and 520,522, respectively, which prohibit insertion of the accessory plug 500 into the terminal block 400 unless the accessory plug 500 is correctly disposed in the aforementioned predetermined orientation, as shown for example, in FIGS. 13 and 14.

Figure 9:
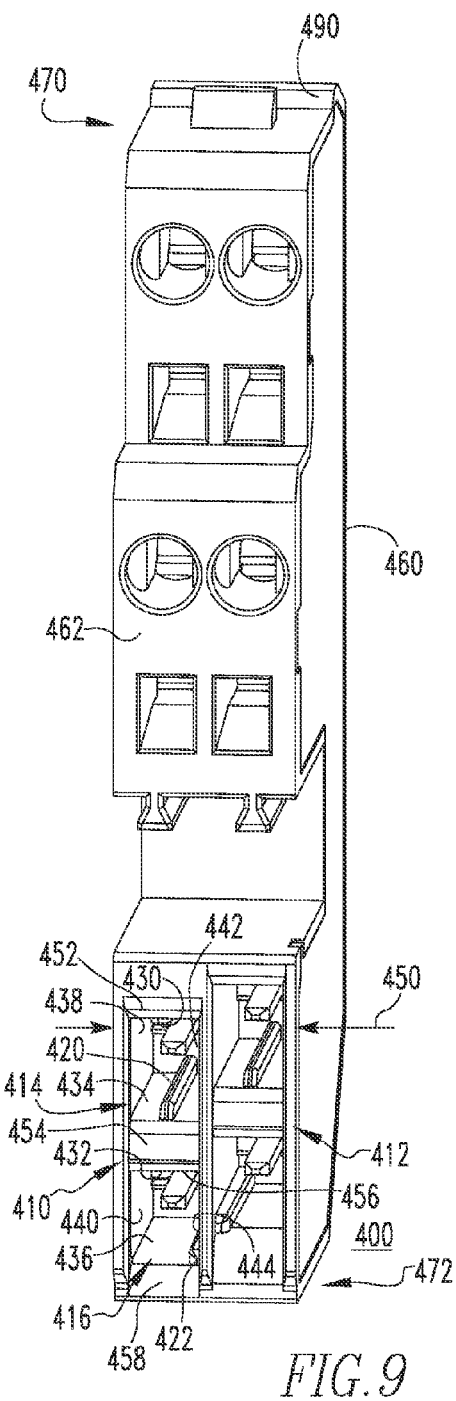
FIG. 9 is an isometric view of a terminal block for the secondary disconnect assembly.

More specifically, as best shown in FIGS. 9 and 10, the terminal block 400 includes a number of receptacles 410,412 (two are shown) each having a number of first error-proofing features 420,422, and the accessory plug 500 includes a plug housing 502 having a number of second error-proofing features 520,522. When the accessory plug 500 is correctly disposed in the aforementioned predetermined orientation (e.g., without limitation, the plug is disposed in the correct upright position, rather than inverted or upside down), as shown for example in the section view of FIG. 14, the second error-proofing features 520,522 cooperate with (i.e., align with and receive) the first error-proofing features 420,422 to permit insertion of the plug housing 502 into the terminal block 400, as shown, for example, in FIG. 13 (see also accessory plugs 500,500' of FIG. 2). In the example shown and described herein, the first error-proofing features comprise a number of elongated ribs 420,422 each protruding into a corresponding one of the receptacles 410,412 of the terminal block 400, as shown in FIG. 9, and the second error-proofing features comprise a number of corresponding elongated slots 520,522 in the plug housing 502, as shown in FIG. 10. Accordingly, when the accessory plug 500 is correctly inserted into the terminal block 400 in the predetermined orientation, the elongated ribs 420,422 of the terminal block 400 are disposed in the corresponding elongated slots 520, 522 of the accessory plug housing 502. Otherwise, if the plug housing 502 is disposed in any other orientation, other than the predetermined orientation shown in FIGS. 13 and 14, the error-proofing features (e.g., 420,422; 520,522) will reject (i.e., prohibit) insertion.

Figure 15:
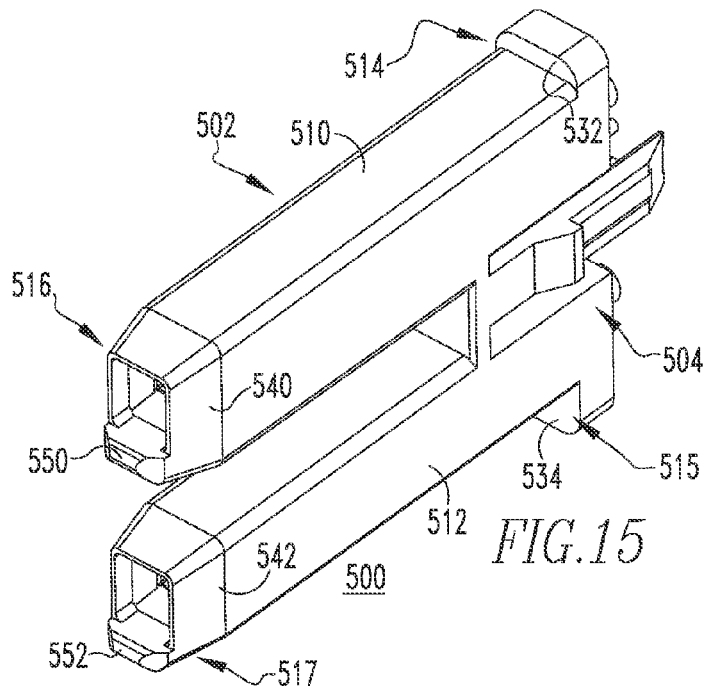
FIG. 15 is a top isometric view of the accessory plug of FIG. 14.
Figure 16:
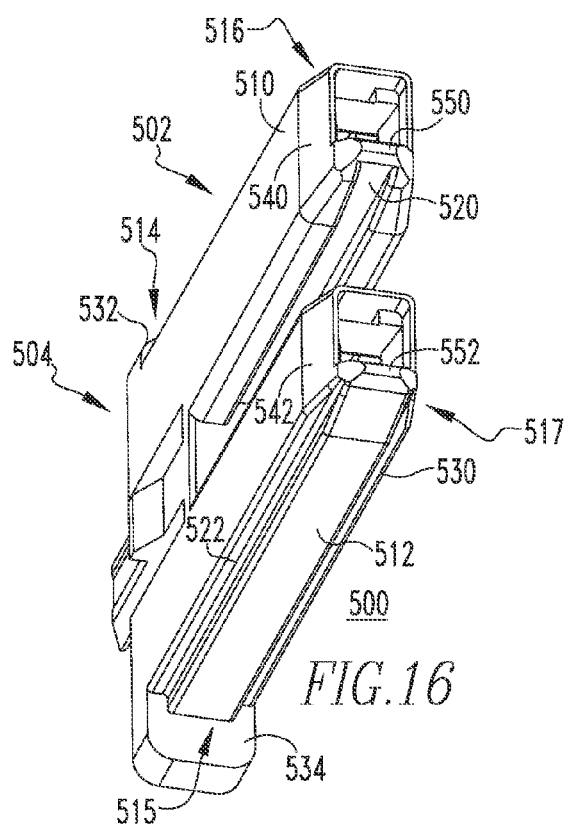
FIG. 16 is a bottom isometric view of the accessory plug of FIG. 15.
Figure 17:
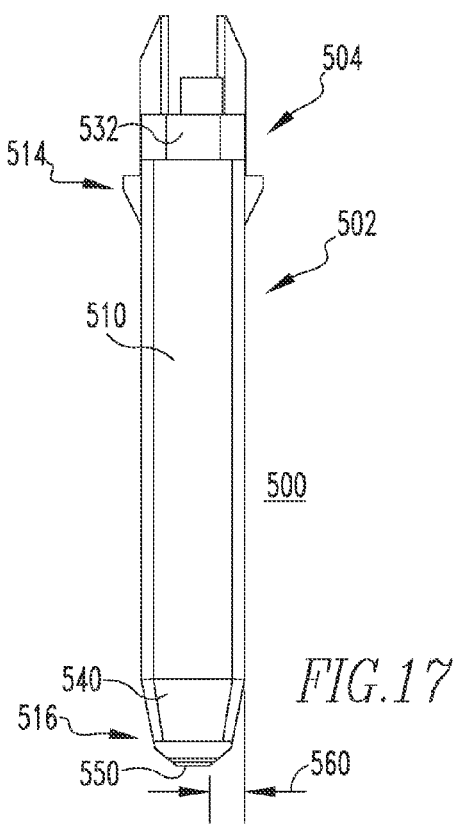
FIG. 17 is top plan view of the accessory plug of FIG. 15.

Continuing to refer to FIGS. 9 and 10, and also to FIGS. 15-17, it will be appreciated that the plug housing 502 of the example secondary disconnect assembly 100 includes a retaining portion 504, a first leg 510 extending outwardly from the retaining portion 504, and a second leg 512 extending outwardly from the retaining portion 504 opposite and spaced from the first leg 510. Each of the terminal block receptacles 410,412 includes a first cavity 414 structured to receive the first leg 510, and a second cavity 416 structured to receive the second leg 512. It will be appreciated that for simplicity of illustration and economy of disclosure, only one of the terminal block receptacles (e.g., first receptacle 410) will be described in detail herein. It will further be appreciated that the first receptacle 410 and any other receptacle (e.g., without limitation, second receptacle 412) of the terminal block 400 may have the same or a different size and/or shape (not shown) and may have any known or suitable alternative number, type and/or configuration of error-proofing features (not shown), without departing from the scope of the disclosed concept.

As best shown in FIG. 9, the first cavity 414 of the example terminal bock 400 includes a first elongated rib 420, and the second cavity 416 includes a second elongated rib 422. As best shown in FIGS. 10 and 16, the first leg 510 of the example accessory plug housing 502 includes a first elongated slot 520 for receiving the first elongated rib 420, and the second leg 512 includes a second elongated slot 522 for receiving the second elongated rib 422.

In one non-limiting embodiment, the first elongated rib 420 is disposed in the first location within a first cavity 414, and the second elongated rib 422 is disposed in a second location within the second cavity 416, wherein the first location of the first elongated rib 420 is different from the second location of the second elongated rib 422. For example and without limitation, in FIG. 9, the first and second terminal block cavities 414,416 each respectively include a top 430,432, a bottom 434,436, a first sidewall 438,440, and a second sidewall 442,444. The first elongated rib 420 is disposed on the bottom 434 of the first cavity 414 substantially centered between the first and second sidewalls 438,440 thereof, whereas the second elongated rib 422 is disposed on the bottom 436 of the second cavity 416 adjacent to a corresponding one of the first and second sidewalls 442,444 thereof. It will be appreciated, however, that alternative embodiments (not shown), for example, wherein the error-proofing features are disposed in the same or similar locations within the respective cavities (e.g., 414, 416), yet still function to effectively reject improper positioning (e.g., without limitation, inverted or upside down) of accessory plugs 500, are also contemplated by the disclosed concept.

It will be appreciated with reference to FIG. 10 that the first elongated slot 520 is positioned in a corresponding location on the underside of the first leg 510 of the accessory plug housing 502 between the first and second sides of the accessory plug housing 502, such that it will receive the first elongated rib 420 if, and only if, the accessory plug housing 502 is correctly disposed in the aforementioned predetermined orientation. Likewise, it will be appreciated that the elongated slot 522 is disposed in a corresponding position on the bottom corner of the second leg 512 of the accessory plug housing 502 adjacent to the first side of the accessory plug housing 502, such that it will receive the second elongated rib 422 if, and only if, the accessory plug housing 502 is correctly disposed in the aforementioned predetermined orientation.

Referring again to FIG. 8, still further error-proofing features are preferably employed with respect to the aforementioned cradle assembly 300 of the secondary disconnect assembly 100. Specifically, as previously discussed, the cradle assembly 300 includes a cradle housing 302 and an inner cradle 304 movably disposed in the cradle housing 302. The inner cradle 304 includes first and second opposing ends 310,312 and a plurality of thru holes 360 (see also FIGS. 2-4, 7A and 7B) extending through the inner cradle 304 between the first end 310 and the second end 312. The thru holes 360 include a number of third error-proofing features, which in the example shown and described herein, comprise an alignment shoulder 362 and a number of flange seats 364,366. The accessory plug 500 is structured to be removably disposed in a fully installed position within a corresponding one of the thru holes 360. The accessory plug housing 502 includes a number of fourth error-proofing features, which in the example shown and described herein, comprise a shoulder recess 530 (FIGS. 10 and 16) and a number of flanges 532,534 (FIGS. 8-9 and 13-17). The fourth error-proofing features (e.g., without limitation, 530,532,534) and the third error-proofing features (e.g., without limitation, 362,364,366) cooperate to prohibit the accessory plug housing 502 from being disposed in the fully installed position within the inner cradle 304, unless the accessory plug 500 is correctly disposed in the aforementioned predetermined orientation.

More specifically, when the accessory plug housing 502 is correctly disposed in the predetermined orientation and is fully installed within a corresponding thru hole 360 of the inner cradle 304, the alignment shoulder 362 is structured to be disposed in the shoulder recess 530 (FIGS. 10 and 16) of the accessory plug housing 502, and each of the flanges 532,534, which extend outwardly from the accessory plug housing 502, is structured to be disposed in a corresponding one of the flange seats 364,366 (both shown in FIG. 8) of the inner cradle 304. That is, in the example shown and described herein, the inner cradle 304 includes first and second flange seats 364,366 and the accessory plug housing 502 includes first and second flanges 532,534. The flanges 532,534 are received within the first and second flange seats 364,366, respectively, to snap the plug housing 502 into position on the cradle assembly 300 if, and only if, the accessory plug 500 is disposed in the correct orientation. Otherwise, the flange seats 364,366 and flanges 532,534, as well as the aforementioned alignment shoulder 362 and corresponding shoulder recess 530, will serve to reject (i.e., prohibit) insertion of the accessory plug 500 into the fully installed position.

Accordingly, among other benefits, by virtue of the fact that the shoulder recess 530 extends substantially the entire length of the accessory plug housing 502 (best shown in FIG. 16), the error-proofing design in accordance with the disclosed concept functions to reject an improperly oriented (e.g., inverted or upside down) accessory plug 500 very early. That is, unlike prior art designs, the accessory plug 500 will be rejected such that it cannot be inserted to a degree wherein unintended and undesired improper electrical connection (e.g., reversed polarity) could potentially occur. Additionally, the disclosed error-proofing features are advantageously mutually exclusive. That is, they are designed to also secure their intended rejection functions to reject electrical connections between improperly positioned components, when used in combination with other existing secondary disconnect assembly systems or components (not shown).

Accordingly, it will be appreciated that the accessory plug 500 can only be fully installed so as to properly move with the cradle assembly 300 and move into and out of proper electrical contact with the corresponding terminal block 400, for example, to electrically connect and disconnect a corresponding accessory 600 (shown in simplified form in FIG. 2) if, and only if, the accessory plug 500 is correctly disposed in the aforementioned predetermined orientation with respect to the inner cradle 304, and fully installed in the corresponding thru hole 360 thereof.

Referring to FIG. 10, it will be appreciated that the first flange 532 of the example accessory plug housing 502 has a length 536 and the second flange 532 has a length 538, which is different than the length 536 of the first flange 534. In other words, the first flange 532 extends outwardly from the retaining portion 504 of the accessory plug housing 502 a length or distance 536, which is less than the length or distance 538 that the second flange 534 extends outwardly from the retaining portion 504 of the accessory plug housing 502.

In accordance with another unique aspect of the disclosed concept, the terminal block 400 has a width 450, which is relatively wider than conventional terminal block designs (not shown). That is, conventional terminal blocks (not shown) are relatively thin such that only one corresponding accessory plug (not shown) can be inserted and electrically connected between the sides of the terminal block. The example terminal block 400, on the other hand, has a width 450 that is at least twice as wide. That is, the terminal block 400 has a plurality of receptacles 410,412 (two are shown) disposed side-by-side in the terminal block 400 such that the terminal block 400 can receive a plurality of accessory plugs 500,500' (both shown in FIG. 2) side-by-side within the width 450 (i.e., between opposing sides) of the terminal block 400. Among other benefits, this relatively wide terminal block design serves to reduce overall manufacturing complexity and cost due to the reduced number of individual terminal blocks required.

Accordingly, it will be appreciated that the disclosed secondary disconnect assembly 400 includes a number of error-proofing features (e.g., without limitation, 362,364,366,420, 422,520,522,530,532,534), which among other benefits, function to ensure proper alignment and interaction among the cradle assembly 300, terminal blocks 400, and accessory plugs 500, thereby improving operation of the secondary disconnect assembly 100 and avoiding damage that could otherwise occur to the circuit breaker 2 (FIG. 1) and/or circuit breaker accessories 600 (shown in simplified form in FIG. 2).

As employed herein, the term "accessory" refers to any known or suitable electrically connectable component, feature or device for use with the disclosed secondary disconnect assembly and circuit breaker, including for example and without limitation, communications, control wiring, and the like.

In addition to the foregoing, the exemplary disconnect assembly 100 further includes a variety of additional mounting features and contact alignment features, which will now be discussed.

Figure 12A:
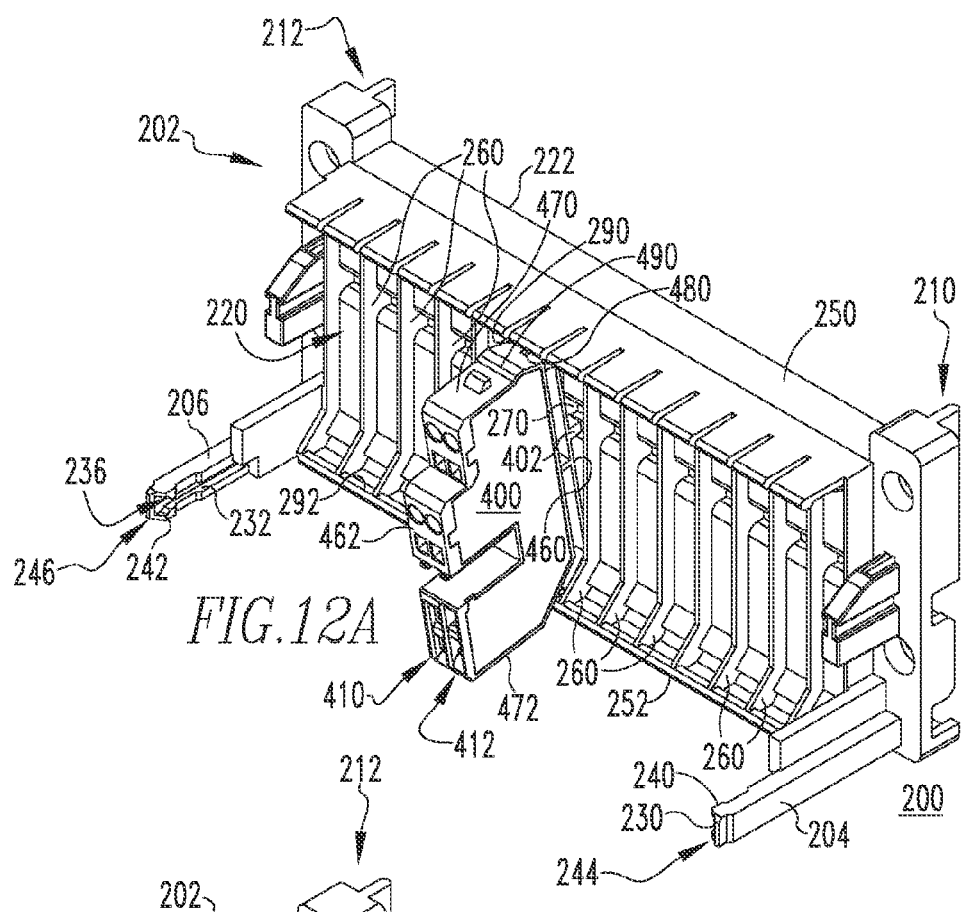
FIG. 12A is an isometric view of the terminal block mount and terminal block of FIG. 11, showing the terminal block in the process of being mounted to the terminal block mount.
Figure 12B:
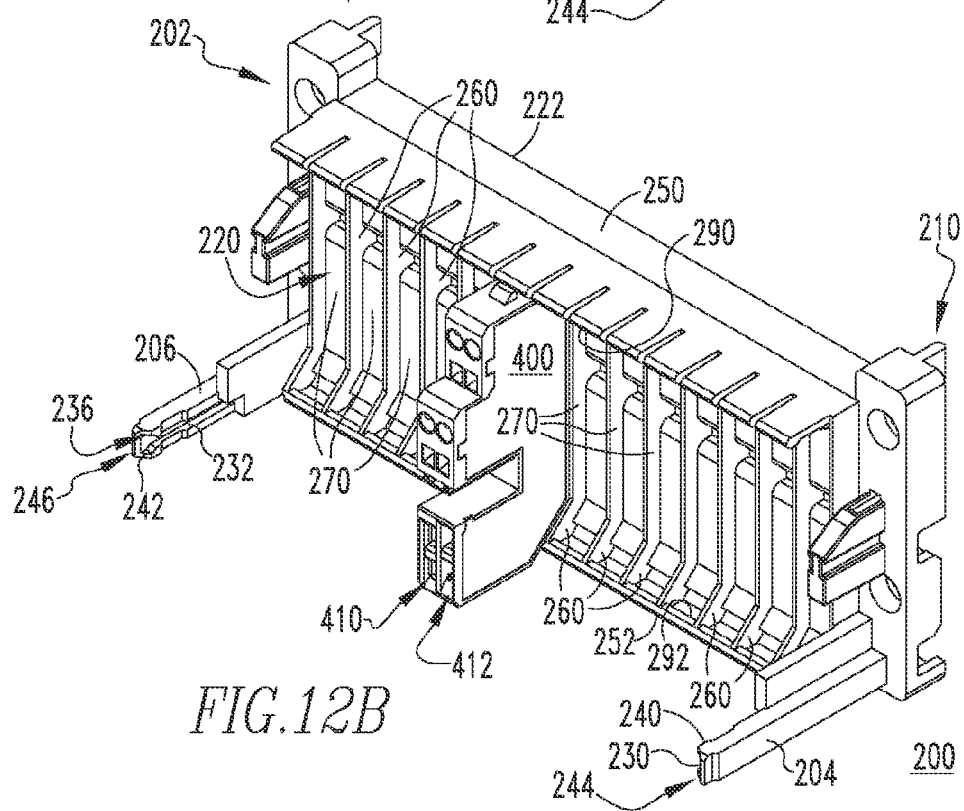
FIG. 12B is an isometric view of the terminal block mount and terminal block of FIG. 12A, showing the terminal block after being mounted to the terminal block mount.

As shown in the exploded view of FIG. 11, the terminal block mount 202 in accordance with non-limiting example embodiment of the disclosed concept, includes a number of first mounting features 280,290,292, and the terminal block 400 includes a number of second mounting features 480,492, 492. As will be discussed, the second mounting features 480, 490,492 cooperate with the first mounting features 280,290, 292 to properly align, mount and stabilize the terminal block 400 on the terminal block mount 202 (see, for example, FIG. 12A showing terminal block 400 being installed on terminal block mount 202, and FIG. 12B showing the terminal block 400 fully installed or mounted on the terminal block mount 202). Furthermore, the aforementioned accessory plugs 500 each include a number of contact alignment features 540,542, 550,552, which as will be discussed, are structured to align and guide the accessory plugs 500 into corresponding receptacles 410 of the terminal block 400 (see, for example, FIG. 13 showing accessory plug 500 inserted into receptacle 410 of terminal block 400, and FIG. 14 showing accessory plug 500 removed from but aligned with receptacle 410 of the terminal block 400).

More specifically, as shown in FIG. 14, the contact alignment features 540,542,550,552 serve to align and guide the first leg 510 of the accessory plug housing 502 into the first cavity 414 of the first receptacle 410 and to align and guide the second leg 512 of the accessory plug housing 502 into the second cavity 416 of receptacle 410. In greater detail, referring to FIGS. 15-17, the first and second legs 510,512 each respectively include a first end 514,515 disposed at our about the retaining portion 504, and a second end 516,517 disposed opposite and distal from the first end 514,515. The contact alignment features include a first tapered portion 540 disposed proximate the second end 516 of the first leg 510 and a second tapered portion 542 disposed proximate the second end 517 of the second leg 512. Such tapered portions 540,542 function to reduce the size of the second ends 516,517 of the legs 510,512, respectively, which in turn provides more tolerance for correcting any initial misalignment with the corresponding cavities 414,416 of receptacle 410 of the terminal block 400. That is, the first tapered portion 540 cooperates with at least one of the top 430, bottom 434, first sidewall 438, and second sidewall 442 of the first cavity 414 to guide the second end 516 of the first leg 510 into the first cavity 414, and the second tapered portion 542 cooperates with at least one of the top 432, bottom 436, first sidewall 440, and second sidewall 444 of the second cavity 416 to guide the second end 517 of the second leg 512 into the second cavity 416.

In addition, the example accessory plug 500 further includes a first tapered nose 550, which extends outwardly from the second end 516 of the first leg 510, and a second tapered nose 552, which extends outwardly from the second end 517 of the second leg 512, as best shown in FIGS. 15 and 16. It will be appreciated that the tapered noses 550,552 further facilitate contact alignment and mating by providing a localized "lead-in" to center and lead or guide the legs 510, 512 into corresponding cavities 414,416, respectively, of the terminal block 400. That is, because the tapered noses 550, 552 extend beyond the openings at the ends of the legs 510, 512 of the accessory plug housing 502, they are capable of further tapering to a reduced size that is smaller than the size of such openings, as best shown in FIGS. 14-16. In other words, without such tapered noses 550,552, the amount of possible taper (i.e., size reduction) would otherwise be limited by the size of the accessory plug leg openings. The tapered noses 550,552 allow a taper beyond that limitation, thereby effectively achieving an even greater alignment tolerance. In one non-limiting embodiment, the first tapered nose 550 provides a lateral reduction in the size of the second end 516 of the first leg 510 of at least 1.0 mm to facilitate horizontal alignment between the first and second sidewalls 438,442 of the first cavity 414 and the second tapered nose 552 preferably likewise provides a lateral reduction in size of the second end 517 of the second leg 512 of at least 1.0 mm to facilitate horizontal alignment between the first and second sidewalls 440,444 of the second cavity 416. In other words, as best shown with reference to the top plan view of FIG. 17, each tapered nose (e.g., without limitation, first tapered nose 550) extends laterally inwardly a distance 560 of at least 1.0 mm. In this manner, the tapered noses 550,552 serve to provide corresponding additional horizontal alignment tolerance with respect to each of the cavity sidewalls (e.g., without limitation, first and second sidewalls 438,442 of first cavity 414), which would have otherwise been limited by the width or size of the openings in the end of the accessory plug housing 502.

Referring, for example, to FIGS. 9 and 14, it will be appreciated that the terminal block 400 preferably also includes a number of contact alignment features (452,454,456,458). In the example shown and described herein, each of the first and second cavities 414,416 further includes at least one chamfer 452,454,456,458 disposed on a corresponding at least one of the top 430,432, the bottom 434,436, the first sidewall 438, 440, and the second sidewall 442,444. Specifically, in the example shown and described herein, the first cavity 414 includes a top chamfer 452 in the top 430 of the first cavity 414 and a bottom chamfer 454 in the bottom 434 of the first cavity 414. The top and bottom chamfers 452,454 cooperate with the first tapered portion 540 of the first leg 510 to align and guide insertion of the first leg 510. Similarly, the second cavity 416 includes top and bottom chamfers 456,458 in the top and bottom 432,436, respectively, of the second cavity 416. Such top and bottom chamfers 456,458 cooperate with the second tapered portion 542 of the second leg 512 to align and guide insertion of the second leg 512 into the second cavity 416.

The aforementioned cradle assembly 300 (FIGS. 2-8, 11, 12A and 12B) preferably also includes at least one contact alignment feature. Specifically, as previously discussed, the inner cradle 304 includes a plurality of thru holes 360 extending through the inner cradle 304 between the first and second ends 310,312 thereof. Such thru holes 360 are defined by a plurality of vertical walls 370, best shown in the enlarged partially in section view of FIG. 8. The vertical walls 370 function to properly align and secure the accessory plug 500 in the cradle assembly 300 for proper movement and interaction (e.g., alignment and electrical connection) with respect to the terminal block 400.

Referring again to FIG. 11, the example terminal block 400 has a mounting side 460, a connection side 462 opposite the mounting side 460, an upper end 470, and a lower end 472 disposed opposite the upper end 470. In the example shown and described herein, the aforementioned first mounting feature(s) comprises a plurality of stabilizing projections 280, each of which protrudes outwardly from the first side 220 of the terminal block mount 202 at or about the first edge 250 thereof. The aforementioned second mounting feature(s) comprises a molded recess 480 in the mounting side 460 of each terminal block 400 at or about the upper end 470 of the terminal block 400. Accordingly, when the terminal block 400 is mounted on the terminal block mount 202, as shown in FIGS. 12A and 12B, the molded recess 480 receives a corresponding one of the stabilizing projections 280 to align and stabilize the terminal block 400 on the terminal block mount 202.

Additionally, the number of first mounting features preferably further comprises a first retention mechanism 290 disposed at or about the first edge 250 of the terminal block mount 202, and a second retention mechanism 292 disposed at or about the second edge 252 of the terminal block mount 202, and the number of second mounting features preferably further comprises a first molded catchment 490 disposed at the upper end 470 of the terminal block 400, and a second molded catchment 492 disposed on the lower end 472 of the terminal block 400. The first retention mechanism 290 engages and retains the first molded catchment 490, and the second retention mechanism 292 engages and retains the second molded catchment 492, as shown in FIGS. 12A and 12B.

It will be appreciated that such mounting features serve to further align and secure terminal blocks 400 in the proper orientation on the terminal block mount 202. As previously discussed, further stability is provided by the fact that the terminal blocks 400 are themselves relatively wider than (e.g., without limitation, up to twice as wide or wider) conventional terminal blocks (not shown). Furthermore, as previously disclosed, the example terminal block mount 202 preferably further includes a plurality of parallel walls 260 extending between the first and second edges 250,252 of the terminal block mount 202 to further align and secure terminal blocks 400 therebetween.

Accordingly, among other benefits, the disclosed secondary disconnect assembly 100 includes a number of mounting features (e.g., without limitation, 280,290,292,480,490,492 and a number of contact alignment features (e.g., without limitation, 370,452,454,456,458,540,542,550,552), which improve component support, alignment and interaction.

In addition to the foregoing, the disclosed secondary disconnect assembly 100 preferably further includes a number of terminal retention and correction features, which address and overcome known problems with prior art designs (not shown), such as premature unlatching of the inner cradle and failure of the inner cradle to reliably return to the latched (i.e., home) position. Such issues can be caused, for example, by such contributing factors as friction on the inner cradle due to assembly variation, part misalignment, and relatively stiff accessory wiring, worn latching components, improper customer use, and the like. If premature unplugging of the secondary terminal connections occurs or if the secondary terminal connections fail to properly align and mate, the circuit breaker will not have any secondary control. As will now be discussed, the disclosed concept overcomes these disadvantages and adds reliability to the system by providing a number of retention members 372,374 (both shown in FIG. 21) structured to overcome issues associated with friction, thereby avoiding premature unplugging, as well as a number of correction features (e.g., without limitation, stop members 390, 392 shown in FIGS. 21 and 24) to correctly align the inner cradle 304 and ensure that it is latched when desired.

Referring to FIGS. 18-20, and the section view of FIG. 21, it will be appreciated that the example cradle assembly 300 preferably includes a number of retention members 372,374, and at least one stop member 390,392 (two are employed in the non-limiting example shown and described herein). As previously discussed, the terminal block mount 202 includes first and second alignment posts 204,206 structured to be removably coupled to the first and second ends 310,312, respectively, of the inner cradle 304. The retention members 372,374 cooperate with the alignment posts 204,206, respectively, to retain the alignment posts 204,206 in a desired position with respect to the inner cradle 304. The stop members 390,392 cooperate with the inner cradle 304 to correctly align the inner cradle 304 with respect to the terminal block mount 202 and facilitate proper positioning of the inner cradle 304 in the latched (i.e., home) position, as desired.

Figure 22:
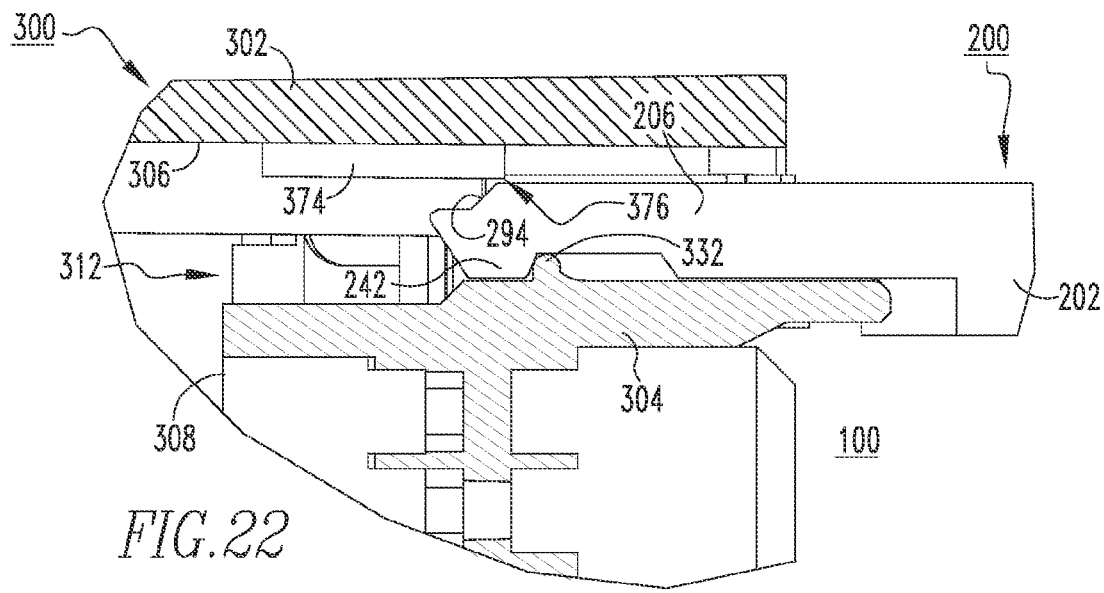
FIG. 22 is an enlarged view of a portion of the cradle assembly and retention feature therefor of FIG. 21, showing the inner cradle in the latched position.
Figure 23:
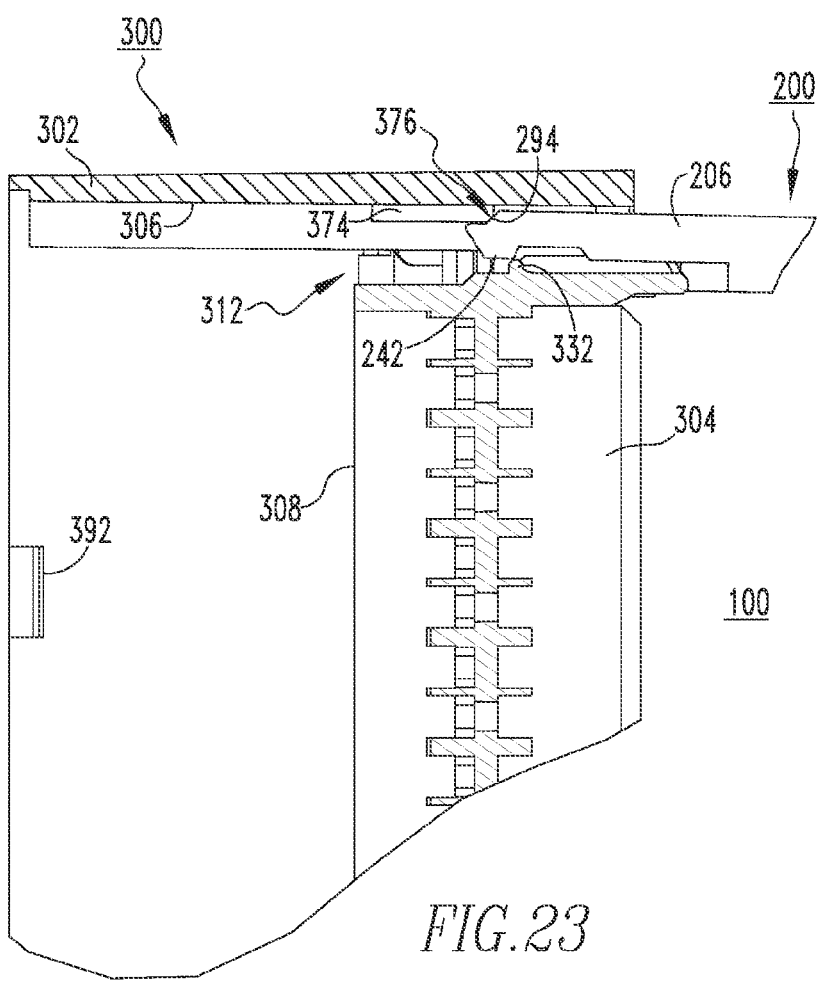
FIG. 23 is another enlarged view of the portion of the cradle assembly and retention feature therefor of FIG. 22, showing the inner cradle in an unlatched position.

More specifically, continuing to refer to FIG. 21, as well as FIGS. 22 and 23, each alignment post 206 is moveable among a first position in which the alignment post 206 is substantially straight and the molded barb 242 engages the corresponding molded boss or detent 332, as shown in FIGS. 21 and 22, and a second position in which the alignment post 206 is deflected outwardly such that the molded barb 242 releases the corresponding respective molded boss or detent 332, as shown in FIG. 23. In the first, undeflected position (FIGS. 21 and 22), the alignment post 206 and, in particular, cooperation of the molded barb 242 with the molded boss or detent 332 on the end 212 of the inner cradle 304, resists movement of the inner cradle 304 with respect to the terminal block mount 202 such that the inner cradle 304 moves with the terminal block mount 202, but not independently with respect thereto. Conversely, in the second, deflected position shown in FIG. 23, the alignment post 206 is deflected outwardly, such that the molded barb 242 disengages the corresponding molded boss or detent 332, releasing the inner cradle 304 to move independently with respect to terminal block mount 202. The retention members, which in the example shown and described herein, are first and second spacers 372,374, prevent such outward deflection of the alignment posts 204,206 (both shown in FIG. 21) to the aforementioned second, deflected position (FIG. 23), unless and until such outward deflection is desired. In this manner, the spacers 372,374 effectively resist premature release of the inner cradle 304. It will be appreciated that for ease of illustration and economy of disclosure, only one spacer 374 has been shown and described in detail herein. It will be appreciated, however, that the other spacer 372 (FIG. 21) is substantially similar in both structure and function.

As shown in FIG. 22, the spacer 374 extends inwardly from the interior 306 of the cradle housing 302 towards the corresponding end 312 of the inner cradle 304. Thus, the spacers 372,374 function to reduce the space between the corresponding alignment posts 204,206 and the interior 306 of the cradle housing 302, when the alignment posts 204,206, respectively, extend between the corresponding spacer 372,374 and first or second end 310,312 of the inner cradle 304. That is, less space is provided such that undesired outward deflection of the alignment posts 204,206 is resisted, which, in turn, functions to prevent premature release of inner cradle 304, as previously discussed.

Continuing to refer to FIGS. 22 and 23, each spacer 374 preferably comprises an elongated molded member, including a deflection edge 376. The deflection edge 376 is structured to cooperate with a corresponding deflection surface 294 of the corresponding alignment post 206. The example deflection surface 294 is a ramped surface on the end of the alignment post 206 generally opposite the molded barb 242. Accordingly, when the terminal block mount 202 moves toward the latched position with respect to the inner cradle 304, the ramped surface 294 engages the deflection edge 376 of the spacer 374, as shown in FIG. 23. As the alignment post 206 continues to move (e.g., to the left from the perspective of FIG. 22), the deflection edge 376 slides along the ramped surface 294 deflecting the alignment post 206 inwardly and moving the molded barb 242 toward engagement with the corresponding molded boss or detent 332 (see, latched (i.e., home) position of FIG. 22). Accordingly, it will be appreciated that the end of each alignment post 206, in accordance with the disclosed concept, incorporates a unique shape to facilitate desired cooperation (e.g., without limitation, deflection) of the alignment post 206 with respect to components of the cradle assembly 300 (e.g., without limitation, interior 306 of cradle housing 302; inner cradle 304; molded boss or detent 332; retention member or space 374). In this manner, the inner cradle 304 remains in the latched (i.e., home) position, or is properly returned to such latched position, as desired for proper and reliable mating of the secondary terminal connections.

Figure 24:
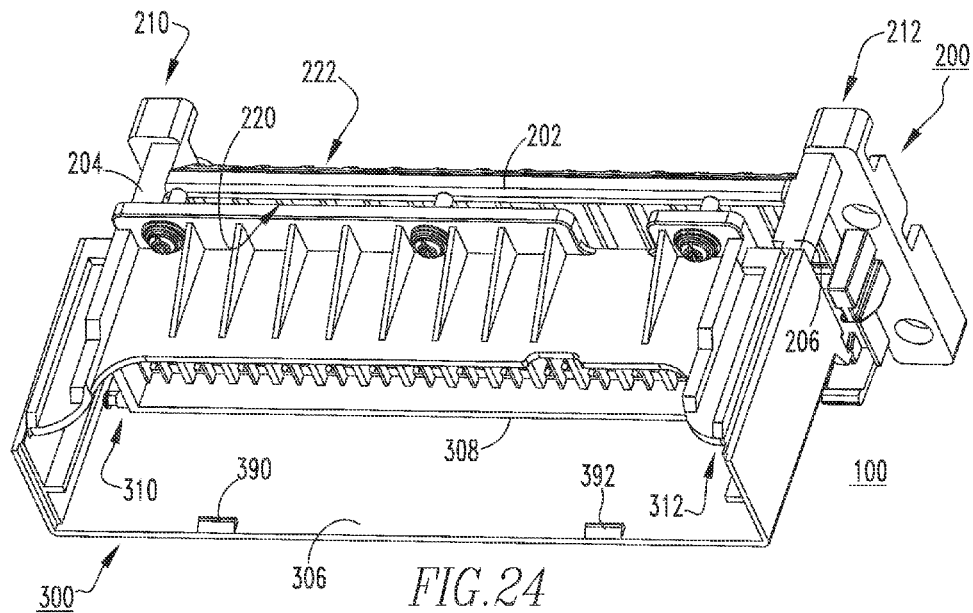
FIG. 24 is a bottom isometric view of the cradle assembly and terminal block mount, also showing a correction feature for the inner cradle.
Figure 25:
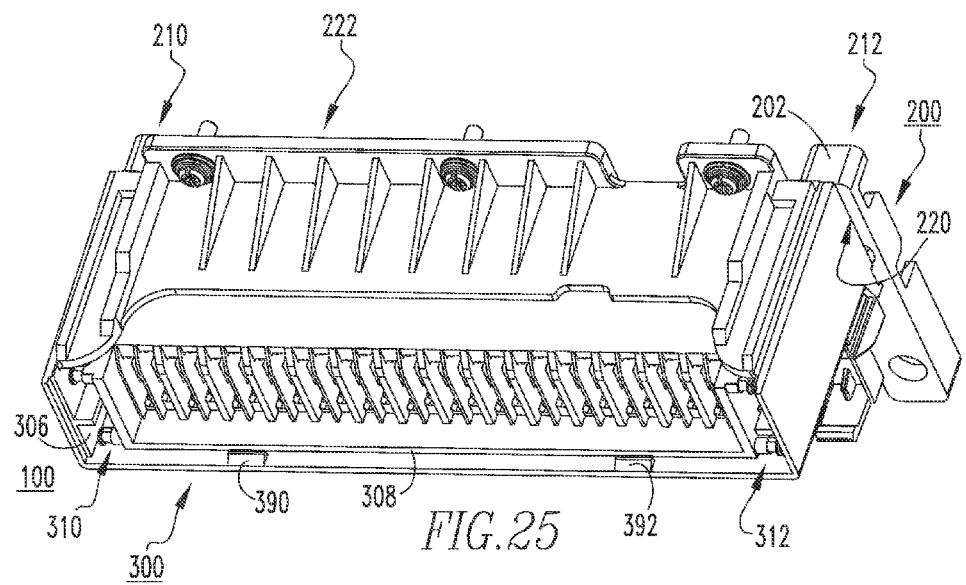
FIG. 25 is another bottom isometric view of the cradle assembly and terminal block mount of FIG. 24, showing the inner cradle cooperating with the correction feature.

Referring to FIGS. 24 and 25, the aforementioned correction feature, which in the example shown and described herein is a pair of molded stop members 390,392 extending inwardly from the interior 306 of the cradle housing 302, will now be described in greater detail. Specifically, the inner cradle 304 further includes a stop edge 308, which moves into (FIG. 25) and out of (FIG. 24) engagement with the stop members 390,392. In the non-limiting example embodiment shown and described, the first molded stop 390 and the second molded stop 392 are spaced apart from each other, as shown in FIG. 24. Such spaced apart relationship, among other benefits, serves an alignment function. More specifically, when the stop edge 308 of the inner cradle 304 abuts both of the first molded stop 390 and the second molded stop 392, as shown in FIG. 25, the inner cradle 304 is correctly aligned with respect to the first and second alignment posts 204,206 and, therefore, with respect to the terminal block mount 202.

In addition to facilitating proper alignment, for example, when the inner cradle 304 is skewed while racking the circuit breaker 2 (FIG. 1) into a cassette 6 (FIG. 1), the correction features (e.g., molded stop members 390,392) also serve a number of other advantageous functions. For example, when the stop edge 308 (FIGS. 21-25) engages the molded stop members 390,392 (see FIG. 25), continued movement will result in the inner cradle 304 being moved toward and into the latched position, which allows the cradle assembly 300 to be reset when the circuit breaker 2 is racked back out of the cassette 6. That is, the correction features (e.g., molded stop members 390,392) will continue to drive the secondary electrical contacts to their mated position when the circuit breaker 2 reaches the CONNECT position. This advantageously ensures full engagement of the secondary contacts is established when the circuit breaker 2 is fully connected to primary and secondary power.

Accordingly, the disclosed secondary disconnect assembly 100 includes a number of terminal retention and correction features that facilitate proper latching, unlatching and relatching of the inner cradle 304 and establish correct alignment and movement for effective and reliable mating of secondary terminal connections.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A secondary disconnect assembly for an electrical switching apparatus, said secondary disconnect assembly comprising:
    a terminal block assembly comprising a mounting member including a number of protrusions; and
    a cradle assembly coupled to said mounting member and being movable among a plurality of positions with respect to said mounting member, said cradle assembly comprising a cradle housing and an inner cradle movably disposed within said cradle housing,
    wherein said number of protrusions align and guide said inner cradle with respect to said mounting member,
    wherein, when said inner cradle is disposed in a first predetermined one of said positions, said number of protrusions engage and lock said inner cradle to restrict movement of said inner cradle with respect to said mounting member, and
    wherein, when said inner cradle is moved toward a second predetermined one of said positions, said number of protrusions are structured to release said inner cradle to move independently with respect to said mounting member.

2. The secondary disconnect assembly of claim 1 wherein said mounting member is a terminal block mount structured to receive a plurality of terminal blocks; wherein said terminal block mount comprises a first end, a second end disposed opposite and distal from the first end, a first side, and a second side disposed opposite the first side; wherein said number of protrusions is a first alignment post and a second alignment post; wherein said first alignment post protrudes outwardly from the first side of said terminal mounting block proximate the first end of said terminal mounting block; and wherein said second alignment post protrudes outwardly from the first side of said terminal mounting block proximate the second end of said terminal mounting block.

3. The secondary disconnect assembly of claim 2 wherein said inner cradle comprises a first end and a second end disposed opposite and distal from the first end of said inner cradle; wherein said first alignment post removably engages a portion of the first end of said inner cradle; and wherein said second alignment post removably engages a portion of the second end of said inner cradle.

4. The secondary disconnect assembly of claim 3 wherein said first alignment post includes a first elongated groove; wherein said second alignment post includes a second elongated groove; wherein the first end of said inner cradle includes a first rib; wherein the second end of said inner cradle includes a second rib; wherein said first rib is movably disposed within said first elongated groove; and wherein said second rib is movably disposed within said second elongated groove.

5. The secondary disconnect assembly of claim 4 wherein said first alignment post and said second alignment post each further include a first sloped segment and a second sloped segment; wherein said first sloped segment of said first alignment post cooperates with said inner cradle to facilitate vertical alignment and guidance of said first rib into said first elongated groove; wherein said second sloped segment of said first alignment post cooperates with said inner cradle to facilitate transverse alignment and guidance of said second rib into said first elongated groove; wherein said first sloped segment of said second alignment post cooperates with said inner cradle to facilitate vertical alignment and guidance of said second rib into said second elongated groove; and wherein said second sloped segment of said second alignment post cooperates with said inner cradle to facilitate transverse alignment and guidance of said second rib into said second elongated groove.

6. The secondary disconnect assembly of claim 3 wherein said first alignment post further includes a first molded barb; wherein said second alignment post further includes a second molded barb; wherein the first end of said inner cradle further includes a first molded boss; wherein the second end of said inner cradle further includes a second molded boss; wherein said first predetermined one of said positions is a latched position corresponding to said inner cradle being fixed in position with respect to said terminal block mount; and wherein, when said inner cradle is disposed in said latched position, said first molded barb engages said first molded boss and said second molded barb engages said second molded boss to resist movement of said inner cradle with respect to said terminal block mount.

7. The secondary disconnect assembly of claim 6 wherein, when said inner cradle is removed from said latched position, said first molded barb is structured to deflect outwardly to release said first molded boss and said second molded barb is structured to deflect outwardly to release said second molded boss, thereby releasing said cradle assembly to move independently with respect to said terminal block mount.

8. The secondary disconnect assembly of claim 6 wherein said inner cradle further comprises a plurality of extension springs; and wherein said extension springs bias said inner cradle toward said latched position.

9. The secondary disconnect assembly of claim 2 wherein said terminal block mount is a single-piece molded member; wherein said single-piece molded member further comprises a first edge, a second edge disposed opposite the first edge, and a plurality of parallel walls extending between the first edge and the second edge on the first side of said terminal block mount; and wherein each of said terminal blocks is structured to be aligned and secured between a corresponding pair of said parallel walls.

10. The secondary disconnect assembly of claim 9 wherein said single-piece molded member further comprises a plurality of molded recesses; and wherein each of said terminal blocks includes a molded protrusion structured to be aligned with and secured within a corresponding one of said molded recesses.

11. An electrical switching apparatus comprising:
a housing; and
a secondary disconnect assembly cooperating with said housing, said secondary disconnect assembly comprising:
a terminal block assembly comprising a mounting member including a number of protrusions, and
a cradle assembly coupled to said mounting member and being movable among a plurality of positions with respect to said mounting member, said cradle assembly comprising a cradle housing and an inner cradle movably disposed within said cradle housing,
wherein said number of protrusions align and guide said inner cradle with respect to said mounting member,
wherein, when said inner cradle is disposed in a first predetermined one of said positions, said number of protrusions engage and lock said inner cradle to restrict movement of said inner cradle with respect to said mounting member, and
wherein, when said inner cradle is moved toward a second predetermined one of said positions, said number of protrusions are structured to release said inner cradle to move independently with respect to said mounting member.

12. The electrical switching apparatus of claim 11 wherein said mounting member is a terminal block mount structured to receive a plurality of terminal blocks; wherein said terminal block mount comprises a first end, a second end disposed opposite and distal from the first end, a first side, and a second side disposed opposite the first side; wherein said number of protrusions is a first alignment post and a second alignment post; wherein said first alignment post protrudes outwardly from the first side of said terminal mounting block proximate the first end of said terminal mounting block; and wherein said second alignment post protrudes outwardly from the first side of said terminal mounting block proximate the second end of said terminal mounting block.

13. The electrical switching apparatus of claim 12 wherein said inner cradle comprises a first end and a second end disposed opposite and distal from the first end of said inner cradle; wherein said first alignment post removably engages a portion of the first end of said inner cradle; and wherein said second alignment post removably engages a portion of the second end of said inner cradle.

14. The electrical switching apparatus of claim 13 wherein said first alignment post includes a first elongated groove; wherein said second alignment post includes a second elongated groove; wherein the first end of said inner cradle includes a first rib; wherein the second end of said inner cradle includes a second rib; wherein said first rib is movably disposed within said first elongated groove; and wherein said second rib is movably disposed within said second elongated groove.

15. The electrical switching apparatus of claim 14 wherein said first alignment post and said second alignment post each further include a first sloped segment and a second sloped segment; wherein said first sloped segment of said first alignment post cooperates with said inner cradle to facilitate vertical alignment and guidance of said first rib into said first elongated groove; wherein said second sloped segment of said first alignment post cooperates with said inner cradle to facilitate transverse alignment and guidance of said second rib into said first elongated groove; wherein said first sloped segment of said second alignment post cooperates with said inner cradle to facilitate vertical alignment and guidance of said second rib into said second elongated groove; and wherein said second sloped segment of said second alignment post cooperates with said inner cradle to facilitate transverse alignment and guidance of said second rib into said second elongated groove.

16. The electrical switching apparatus of claim 13 wherein said first alignment post further includes a first molded barb; wherein said second alignment post further includes a second molded barb; wherein the first end of said inner cradle further includes a first molded boss; wherein the second end of said inner cradle further includes a second molded boss; wherein said first predetermined one of said positions is a latched position corresponding to said inner cradle being fixed in position with respect to said terminal block mount; and wherein, when said inner cradle is disposed in said latched position, said first molded barb engages said first molded boss and said second molded barb engages said second molded boss to resist movement of said inner cradle with respect to said terminal block mount.

17. The electrical switching apparatus of claim 16 wherein, when said inner cradle is removed from said latched position, said first molded barb is structured to deflect outwardly to release said first molded boss and said second molded barb is structured to deflect outwardly to release said second molded boss, thereby releasing said inner assembly to move independently with respect to said terminal block mount.

18. The electrical switching apparatus of claim 16 wherein said cradle assembly further comprises a plurality of extension springs; and wherein said extension springs bias said inner cradle toward said latched position.

19. The electrical switching apparatus of claim 12 wherein said terminal block mount is a single-piece molded member; wherein said single-piece molded member further comprises a first edge, a second edge disposed opposite the first edge, and a plurality of parallel walls extending between the first edge and the second edge on the first side of said terminal block mount; and wherein each of said terminal blocks is structured to be aligned and secured between a corresponding pair of said parallel walls.

20. The electrical switching apparatus of claim 19 wherein said single-piece molded member further comprises a plurality of molded recesses; and wherein each of said terminal blocks includes a molded protrusion structured to be aligned with and secured within a corresponding one of said molded recesses.

* * * * *